US010360487B2

(12) United States Patent
Mao

(10) Patent No.: US 10,360,487 B2
(45) Date of Patent: Jul. 23, 2019

(54) METHOD, SYSTEM, SCANNING DEVICE, TERMINAL AND ENCODER FOR MONITORING A PRODUCT QUALITY GUARANTEE PERIOD

(71) Applicant: Alibaba Group Holding Limited, Grand Cayman (KY)

(72) Inventor: Xin Mao, Hangzhou (CN)

(73) Assignee: Alibaba Group Holding Limited, Grand Cayman (KY)

(*) Notice: Subject to any disclaimer, the term of this patent is extended or adjusted under 35 U.S.C. 154(b) by 0 days.

(21) Appl. No.: 15/799,973

(22) Filed: Oct. 31, 2017

(65) Prior Publication Data

US 2018/0053080 A1 Feb. 22, 2018

Related U.S. Application Data

(63) Continuation of application No. PCT/CN2016/078600, filed on Apr. 6, 2016.

(30) Foreign Application Priority Data

May 4, 2015 (CN) .......................... 2015 1 0225360

(51) Int. Cl.
G06K 19/07 (2006.01)
G06F 7/48 (2006.01)
(Continued)

(52) U.S. Cl.
CPC ........... G06K 19/0716 (2013.01); G06F 7/48 (2013.01); G06K 7/14 (2013.01); G06K 17/0022 (2013.01);
(Continued)

(58) Field of Classification Search
CPC .. G06F 7/48; G06K 17/0022; G06K 19/0716; G06K 7/14
See application file for complete search history.

(56) References Cited

U.S. PATENT DOCUMENTS 6,982,640 B2 * 1/2006 Lindsay ............. G06K 17/0022
340/10.1
7,301,439 B2 * 11/2007 Hashimoto .......... G06K 7/0008
340/10.41
(Continued)

FOREIGN PATENT DOCUMENTS

CN 202304244 7/2012
CN 102645083 8/2012
(Continued)

OTHER PUBLICATIONS

Translation of International Search Report from corresponding PCT application No. PCT/CN2016/078600 dated Jun. 27, 2016, 2 pages.
(Continued)

Primary Examiner — Seung H Lee
(74) Attorney, Agent, or Firm — Lee & Hayes, P.C.

(57) ABSTRACT

A method, a system, a scanning device, a terminal and an encoder for monitoring a quality guarantee period of a product are disclosed. The method includes scanning a tag of a product to obtain an identifier of the tag of the product and a product quality guarantee period corresponding to the identifier; recording an initial time at which the tag is scanned in response to the identifier being a new identifier; and sending the identifier, the product quality guarantee period and the initial time to a terminal, to enable the terminal to monitor the quality guarantee period. The present disclosure implements real-time monitoring of a quality guarantee period of a product based on a correspondence relationship among an identifier, the quality guarantee period, and an initial time of scanning the tag. Operations thereof are simple, with an automatic provision of an accurate time monitoring, thus improving user experience.

20 Claims, 9 Drawing Sheets

(51) Int. Cl.
  *G06K 7/14* (2006.01)
  *G06K 17/00* (2006.01)
  *F25D 29/00* (2006.01)
(52) U.S. Cl.
  CPC .......... *F25D 29/00* (2013.01); *F25D 2700/08* (2013.01); *Y02P 90/02* (2015.11)

(56) References Cited

U.S. PATENT DOCUMENTS

| | | | | |
|---|---|---|---|---|
| 7,937,289 | B2* | 5/2011 | Bodin | G06Q 10/087 |
| | | | | 235/440 |
| 7,973,642 | B2* | 7/2011 | Schackmuth | G06Q 10/06 |
| | | | | 340/10.51 |
| 2011/0193716 | A1 | 8/2011 | Goff et al. | |
| 2011/0258130 | A1* | 10/2011 | Grabiner | G06Q 10/087 |
| | | | | 705/317 |

FOREIGN PATENT DOCUMENTS

| | | |
|---|---|---|
| CN | 103196277 | 7/2013 |
| CN | 103514426 A | 1/2014 |
| CN | 103679226 A | 3/2014 |
| EP | 1980807 | 10/2008 |

OTHER PUBLICATIONS

Translation of Written Opinion from corresponding PCT application No. PCT/CN2016/078600 dated Jun. 27, 2016, 7 pages.

The Chinese Office Action dated Nov. 2, 2018 for Chinese patent application No. 201510225360.6, a counterpart foreing of U.S. Appl. No. 15/799,973, 5 pages.

The Chinese Search Report dated Mar. 5, 2018 for Chinese Application No. 201510225360.6, 1 page.

* cited by examiner

METHOD, SYSTEM, SCANNING DEVICE, TERMINAL AND ENCODER FOR MONITORING A PRODUCT QUALITY GUARANTEE PERIOD

CROSS REFERENCE TO RELATED PATENT APPLICATIONS

This application claims priority to and is a continuation of PCT Patent Application No. PCT/CN2016/078600 filed on 6 Apr. 2016, and is related to and claims priority to Chinese Patent Application No. 201510225360.6, filed on 4 May 2015, entitled "Method, System, Scanning Device, Terminal and Encoder for Monitoring a Product Quality Guarantee Period," which are hereby incorporated by reference in their entirety.

TECHNICAL FIELD

The present disclosure relates to the field of computers, and particularly to methods, systems, scanning devices, terminals, and encoders for monitoring quality guarantee periods of products.

BACKGROUND

Concepts of intelligent refrigerators and networked refrigerators have been developed by people. A refrigerator is no longer an appliance that stores foods. Future refrigerators will also possess food management and even automatic purchase functionalities. Furthermore, besides situations of food storage, monitoring and management of quality guarantee periods of a number of other products (for example, products that are consumable and have short quality guarantee periods, such as medications, biological products, etc.) is needed when being stored in a refrigerator.

However, various types of solutions for product storage devices in existing technologies, including two-dimensional scanning, electronic tagging, image identification, etc., simply obtain identifications of tags and information of products corresponding to the tags only, and fail to monitor quality guarantee periods of the products in a simple and accurate manner in real time. Moreover, operations in the existing technologies are relatively tedious. For example, information, such as a name, a selected quality guarantee period, etc., needs to be entered each time when a product is placed in. This leads to the disadvantages of complicated operations and poor user experience.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or processor-readable/computer-readable instructions as permitted by the context above and throughout the present disclosure.

The present disclosure aims to provide methods, apparatuses and systems of monitoring a product quality guarantee period in a scanning device, a terminal and an encoder.

In implementations, the present disclosure provides a method of monitoring a product quality guarantee period in a scanning device, which includes scanning a tag of a product and obtaining an identifier of the tag and a product quality guarantee period corresponding to the identifier; recording an initial time at which the tag is scanned in response to the identifier being a new identifier; and sending the identifier, the product quality guarantee period and the initial time to a terminal to enable the terminal to perform a quality guarantee period monitoring based on the product quality guarantee period and the initial time.

In implementations, the present disclosure provides a method of monitoring a product quality guarantee period in a terminal which includes receiving an identifier, a product quality guarantee period and an initial time from a scanning device, wherein the scanning device scans a tag of a product to obtain the identifier of the tag and the product quality guarantee period corresponding to the identifier, and the scanning device records the initial time at when the tag is scanned in response to the identifier is a new identifier; and perform a quality guarantee period monitoring based on the product quality guarantee period and the initial time.

In implementations, the present disclosure provides a method of monitoring a product quality guarantee period in an encoder, which includes setting a new identifier for each tag to enable a scanning device to obtain an identifier of a tag and a quality guarantee period of a product corresponding to the identifier by scanning the tag of the product; enabling the scanning device to record an initial time at which the tag is scanned in response to the identifier is a new identifier; enabling the scanning device to send the identifier, the product quality guarantee period and the initial time to a terminal; and enabling the terminal to perform monitoring of the quality guarantee period based on the product quality guarantee period and the initial time.

In implementations, the present disclosure provides a scanning device for monitoring a quality guarantee period of a product, which includes a first module used for scanning a tag of a product to obtain an identifier of the tag and a product quality guarantee period corresponding to the identifier; a third module used for recording an initial time at which the tag is scanned in response to the identifier being a new identifier; and a fifth module used for sending the identifier, the product quality guarantee period and the initial time to a terminal to enable the terminal to monitor the quality guarantee period based on the product quality guarantee period and the initial time.

In implementations, the present disclosure provides a terminal for monitoring a quality guarantee period of a product, which includes a second module used for receiving an identifier, a product quality guarantee period and an initial time from a scanning device, wherein the scanning device scans a tag of a product to obtain the identifier of the tag and the product quality guarantee period corresponding to the identifier, and the scanning device records the initial time at which the tag is scanned in response to the identifier being a new identifier; and a fourth module used for monitoring the quality guarantee period based on the product quality guarantee period and the initial time.

In implementations, the present disclosure provides an encoder for monitoring a quality guarantee period of a product, which includes a thirty-first module used for setting a new identifier for each tag to enable a scanning device to obtain an identifier of a tag and a quality guarantee period of a product corresponding to the identifier by scanning the tag of the product; enabling the scanning device to record an initial time at which the tag is scanned in response to the identifier is a new identifier; enabling the scanning device to send the identifier, the quality guarantee period of the product and the initial time to a terminal; and enabling the terminal to perform monitoring of the quality guarantee period based on the quality guarantee period of the product and the initial time.

In implementations, the present disclosure provides a system for monitoring a quality guarantee period of a product, which includes the scanning device and the terminal as described in the present disclosure.

As compared with the existing technologies, the present disclosure obtains an identifier of a tag of a product and a product quality guarantee period corresponding to the identifier through a scanning device, records an initial time at which the tag is scanned in response to the identifier being a new identifier, and sends the identifier, the product quality guarantee period and the initial time to a terminal, to enable the terminal to perform a quality guarantee period monitoring. Accordingly, the present disclosure implements real-time monitoring of a quality guarantee period of a product based on a correspondence relationship among an identifier, the quality guarantee period of the product and a tag, and an initial time of scanning the tag. Operations thereof are simple, with an automatic provision of an accurate time monitoring, thus improving user experience.

BRIEF DESCRIPTION OF THE DRAWINGS

By reading and referencing the accompanying drawings as follows, non-limiting embodiments are described in detail, and other features, purposes and advantages of the present disclosure will be made more clearly.

Same or similar drawing labels represent same or similar elements.

DETAILED DESCRIPTION

The present disclosure is described in further detail herein in conjunction with the accompanying drawings.

In a typical configuration of the present disclosure, a terminal, a device of a service network, and a trusted party may include one or more processors (CPU), an input/output interface, a network interface, and memory.

The memory may include a form of computer readable media such as a volatile memory, a random access memory (RAM) and/or a non-volatile memory, for example, a read-only memory (ROM) or a flash RAM. The memory is an example of a computer readable media.

The computer readable media may include a volatile or non-volatile type, a removable or non-removable media, which may achieve storage of information using any method or technology. The information may include a computer-readable instruction, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer readable media does not include transitory media, such as modulated data signals and carrier waves.

Figure 1:
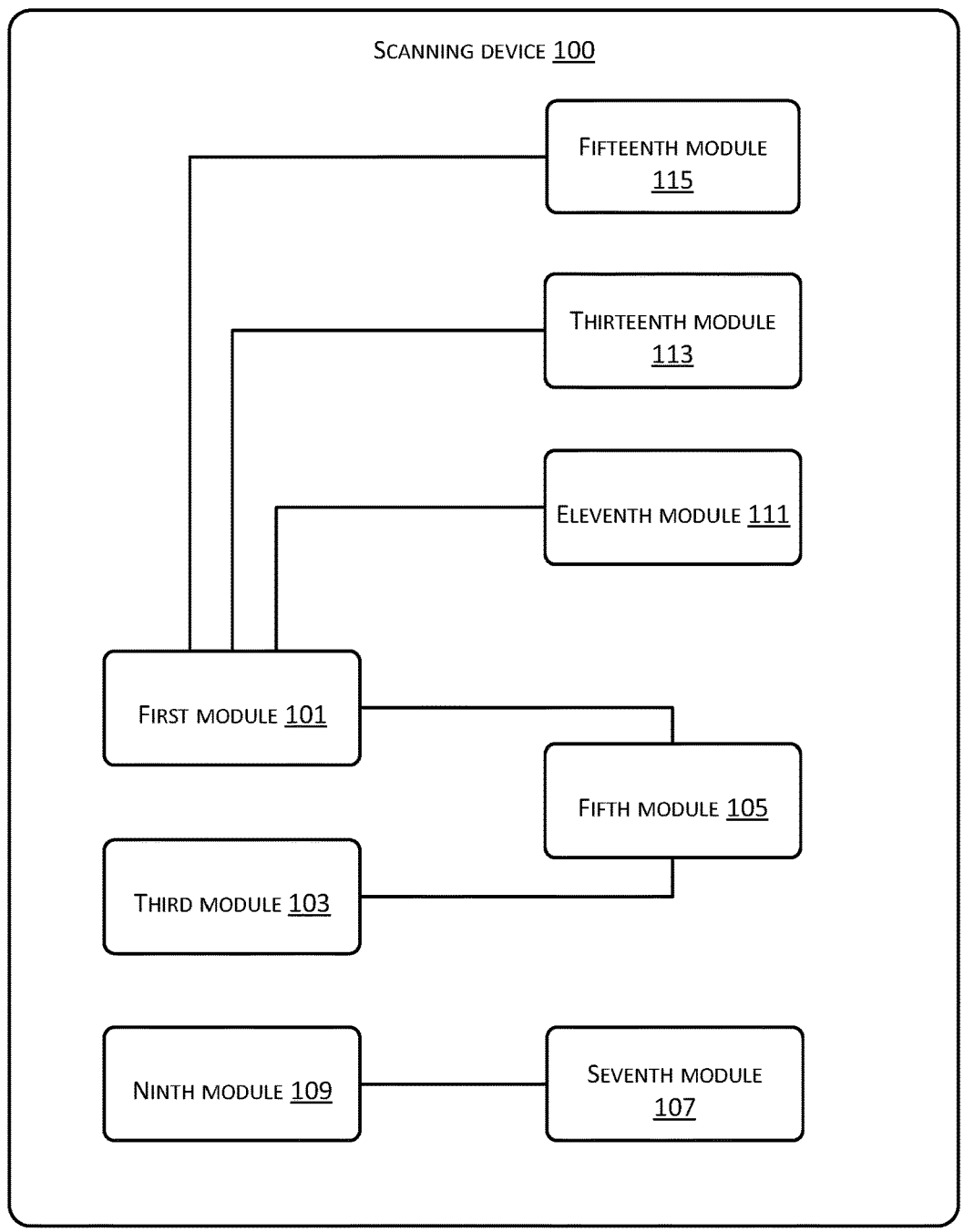
FIG. 1 shows a schematic structural diagram of a scanning device for monitoring a product quality guarantee period according to the present disclosure.

FIG. 1 shows a schematic structural diagram of a scanning device 100 for monitoring a quality guarantee period of a product. The scanning device 100 may include a first module 101, a third module 103, and a fifth module 105.

The first module 101 scans a tag of a product to obtain an identifier of the tag and a product quality guarantee period corresponding to the tag. When the identifier is a new identifier, the third module 103 records an initial time at which the tag is scanned. The fifth module 105 sends the identifier, the product quality guarantee period and the initial time to a terminal, to enable the terminal to perform a quality guarantee period monitoring based on the product quality guarantee period and the initial time.

Information stored in a tag includes an identifier and a quality guarantee period of a product. The tag and the identifier (ID) mutually correspond to each other, and the identifier and the quality guarantee period of the product mutually correspond to each other. A quality guarantee period of a product is set for each tag. A tag is attached to a product, providing a product quality guarantee period corresponding to the product. The first module 101 can obtain an identifier and a product quality guarantee period included in a tag of a product when the tag is scanned. When the first module 101 finds that the identifier is an identifier that has not been recorded, this indicates that this identifier is put into a containing apparatus for the first time. In this case, the third module 103 records an initial time at which the tag is scanned. The fifth module 105 then sends the identifier, the product quality guarantee period and the initial time to a terminal, to enable the terminal to perform a quality guarantee period monitoring based on the product quality guarantee period and the initial time, and obtain a monitoring result corresponding to the identifier. The terminal may perform a countdown calculation based on the initial time and the product quality guarantee period. When a calculation result obtained by the countdown reaches a preset threshold, the terminal sends a reminder to a user that the product to which the tag is attached reaches the quality guarantee period based on the identifier. The containing apparatus is used for storing products, which may be a refrigerator, a storage box, etc. The scanning device is set up in the containing apparatus. The product includes a product that needs to undergo a time monitoring. Examples include products that have quality guarantee periods, such as foods, medications, biological products, etc. The tag may be attached to the product through affixing, stapling, etc. The scanning device may scan the tag using methods such as RFID (Radio Frequency Identification), two-dimensional scanning, barcode scanning, image recognition, etc.

In implementations, the tag adopts an electronic tag, and the first module 101 may use a RFID reading module.

In this case, the electronic tag is scanned using a RFID approach. When the product is placed into the containing apparatus, the first module 101 communicates with the electronic tag by sending a radio frequency signal. All electronic tags receive the radio frequency signal, and send unique identifiers and corresponding product quality guarantee periods stored in respective chips using power obtained via an electric current that is sensed. This does not need to get in contact with products or use a specified gesture to scan the products. For example, a two-dimensional scanning method needs a scanning device to aim at a two-dimensional code for scanning. As such, a user gesture of scanning a tag of a product is skipped, and user operations are minimized. An electronic tag is just needed to be attached when placing a product, and monitoring of quality guarantee periods is automatically performed without human intervention.

In implementations, the scanning device 100 may further include a seventh module 107 and a ninth module 109.

The seventh module 107 receives a lightening instruction from the terminal, and the ninth module 109 controls an illumination unit to which the tag is attached to produce a light according to the lightening instruction.

The terminal sends a lightening instruction to the scanning device based on a user operation of selecting a product in the containing apparatus and a respective identifier. The seventh module 107 controls the ninth module 109 to operate an illumination unit that attaches onto the tag to produce a light according to the lightening instruction, upon receiving the lightening instruction from the terminal. For example, the user clicks an image corresponding to a tag displayed in a screen of the terminal, the terminal sends an identifier of the tag and a lightening instruction to the scanning device, to instruct the scanning device to illuminate the corresponding tag based on the identifier. After receiving the lightening instruction, the seventh module 107 controls the ninth module 109 to send out a scanning signal. An electronic tag uses a sensing antenna to sense and receive RF (radio frequency) energy in a magnetic field formed by a radio frequency signal having a certain frequency that is emitted by the scanning device using, to drive and cause the electronic tag to emit light. Therefore, the electronic tag emits light according to the selection operation of the user, to facilitate the user to find the corresponding product to which the tag is attached.

In implementations, the scanning device 100 may further include an eleventh module 111.

The first module 101 may scan corresponding tags of products in the containing apparatus on a regular or periodic basis. The eleventh module 111 sends a current scanned list of identifiers to the terminal.

The eleventh module 111 sends a current scanned list of identifiers to the terminal. The terminal compares a historically stored list of identifiers with the current scanned list of identifiers, and labels an identifier that appears in the historically stored list of identifiers but not in the current scanned list of identifiers as a first status. The first status represents that a corresponding tag is not in the containing apparatus. The terminal stops a countdown calculation for the corresponding tag based on the identifier and the first status. The terminal further compares the historically stored list of identifiers with the current scanned list of identifiers, and labels an identifier that has been labeled as a first status and reappears in the current scanned list of identifiers as a second status. The second status represents that an associated tag is placed back into the containing apparatus. The terminal continues a countdown calculation for the corresponding tag based on the identifier and the second status. For example, the first module 101 performs scanning on a regular basis. When a user takes out a product from the containing apparatus, the scanning device detects that a corresponding tag is not included in the containing apparatus. The eleventh module 111 sends a current scanned list of identifiers to the terminal. The terminal performs a comparison between the current scanned list of identifiers that is received and a historical list of identifiers that is stored in the terminal, and detects some previously stored identifiers that are not among the received identifiers. Tags corresponding thereto are labeled with a first status, indicating that the corresponding tags are not in the containing apparatus and are taken out by the user. In this case, countdown calculations for the corresponding tags are stopped, to save resources. If an identifier that is previously labeled with a first status reappears in the current scanned list of identifiers after the comparison between the current scanned list of identifiers and a historically stored list of identifiers, this indicates that a tag thereof is put back into the containing apparatus. In this case, a countdown calculation for the corresponding tag is continued. As such, continuing or stopping a countdown calculation for a corresponding tag is implemented based on an action of a user for taking a product from or into the containing apparatus. For example, a user takes a food product from a refrigerator, and puts it back into the refrigerator after eating a portion thereof. Under this situation, a countdown calculation for a corresponding tag of the food product is stopped or continued.

In implementations, the scanning device 100 may further include a thirteenth module 113.

The first module 101 scans tags of products in a corresponding containing apparatus on a regular or periodic basis. The thirteenth module 113 sends recorded identifier(s) and a first status to the terminal when the recorded identifier(s) is/are not found in a scan.

In this case, the first status represents that corresponding tag(s) is/are not in the containing apparatus. In response to receiving the identifier(s) and the first status, the terminal labels the recorded identifier(s) with the first status. The terminal stops a countdown calculation for the corresponding tag(s) based on the recorded identifier(s) and the first status. As being different from an approach that uses a comparison between a current scanned list of identifiers and a historically stored list of identifiers, the thirteenth module 113 directly sends recorded identifier(s) and the first status to the terminal when recorded identifier(s) is/are found in a scan, without the need of the terminal to perform the comparison. This reduces the workload of the terminal, having a low consumption of a network flow.

In implementations, when a recorded identifier is found in a scan, the thirteenth module 113 sends the recorded identifier and a second status to the terminal.

In this case, the second status represents that a tag thereof is put back into the containing apparatus. In response to receiving the identifier and the second status, the terminal labels the recorded identifier with the second status. The terminal continues a countdown calculation of the corresponding tag based on the recorded identifier and the second status. Similarly, the second status is sent from the scanning device, and the terminal does not need to perform a comparison between a current scanned list of identifiers and a historically stored list of identifiers, thus reducing the workload of the terminal and having a low consumption of a network flow.

In implementations, the scanning device 100 may further include a fifteenth module 115.

When no recorded identifier is found in a scan, the fifteenth module 115 labels a scanning status of a tag thereof as an "update" status.

In this case, when the first module 101 does not find an identifier that has been recorded through scanning, this indicates that a corresponding tag has been taken out of the containing apparatus, and a product storage condition has changed. A notification to the terminal for stopping or continuing a countdown calculation is needed. In this case, the fifteenth module 115 labels a tag scanning status of the scanning device as "update". When the terminal conducts communications and connections with the scanning device, the terminal first examines the tag scanning status of the scanning device. If the tag scanning status is labeled as "update", the terminal requests the scanning device to send updated data. The updated data includes a current scanned list of identifiers, or identifier(s) labeled with a first status or a second status.

Figure 2:
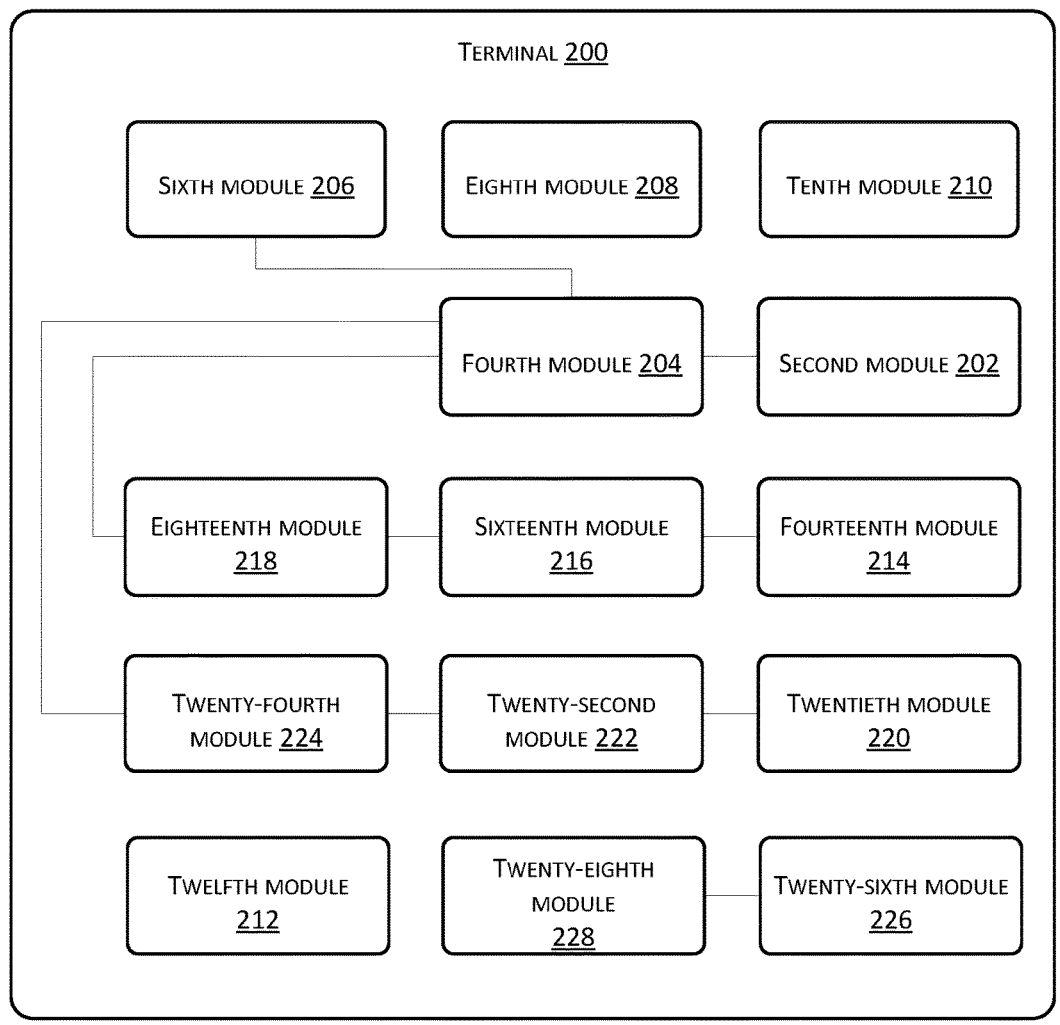
FIG. 2 shows a schematic structural diagram of a terminal for monitoring a quality guarantee period of a product according to the present disclosure.

FIG. 2 shows a schematic structural diagram of a terminal 200 for monitoring a quality guarantee period of a product. The terminal 200 includes a second module 202 and a fourth module 204.

A scanning device scans a tag of a product to obtain an identifier of the tag and a quality guarantee period of the product corresponding to the identifier. When the identifier is a new identifier, the scanning device records an initial time at which the tag is scanned. The second module 202 receives the identifier, the quality guarantee period of the product, and the initial time sent from the scanning device. The fourth module 204 performs monitoring of the quality guarantee period based on the quality guarantee period of the product and the initial time.

Information stored in a tag includes an identifier and a quality guarantee period of a product. The tag and the identifier (ID) mutually correspond to each other, and the identifier and the quality guarantee period of the product mutually correspond to each other. A quality guarantee period of a product is set for each tag. A tag is attached to a product, providing a product quality guarantee period corresponding to the product. A scanning device can obtain an identifier and a quality guarantee period of a product when scanning a tag on the product. When the scanning device detects the identifier as an identifier that has not been recorded, this indicates that this tag is placed into a containing apparatus for the first time. In this case, the scanning device records an initial time at which the tag is scanned. The scanning device then sends the identifier, the quality guarantee period of the product and the initial time to the second module 202. The fourth module 204 is used for monitoring the quality guarantee period based on the quality guarantee period of the product and the initial time. The containing apparatus, which can be a refrigerator, a storage box, etc., is used for storing products. The product includes a product that needs to undergo a time monitoring. Examples include products that have quality guarantee periods, such as foods, medications, biological products, etc. The tag may be attached to the product through affixing, stapling, etc. The scanning device may scan the tag using methods such as RFID (Radio Frequency Identification), two-dimensional scanning, barcode scanning, image recognition, etc. The terminal can be a device that is capable of conducting communications and performing computations, which includes a mobile phone, a tablet computer, a desktop computer, etc.

In implementations, the fourth module 204 performs a countdown calculation based on the initial time and the quality guarantee period of the product corresponding to the identifier. When a calculation result of the countdown calculation reaches a preset threshold, the fourth module 204 reminds a user that the product to which the tag is attached has reached the quality guarantee period based on the identifier.

In implementations, the following formula may be used for the countdown calculation:

$$T_s = T_c + L - T_d$$

$T_s$ represents a remaining time, $T_c$ represents an initial time, L represents a quality guarantee period of a product, and $T_d$ represents a current time.

The current time $T_d$ refers to current time information obtained by the terminal using a clock. The calculation result of the countdown calculation refers to the remaining time $T_s$. When the remaining time $T_s$ obtained from the calculation is less than the preset threshold, e.g., less than one day, the fourth module 204 reminds the user that the corresponding tag is close to the quality guarantee period of the product. For example, a serial number or name of the tag that is expired is displayed via a screen. A remaining valid time period for the tag may also be displayed.

In implementations, the terminal 200 may further include a sixth module 206.

The sixth module 206 generates and displays a statistical list of quality guarantee periods based on a result of monitoring quality guarantee periods.

The sixth module 206 obtains respective calculation results of countdown of various identifiers base based on an identifier list, i.e., respective remaining times $T_s$, and displays a correspondence list of the identifiers and the remaining times, i.e., a statistical list of quality guarantee periods, based on query operations of a user, to facilitate the user to search and read conditions associated with quality guarantee periods of products that are stored.

In implementations, the terminal 200 may further include an eighth module 208.

In response to detecting that a time period of having no communications with the scanning device is greater than a preset time duration, the eighth module 208 provides a prompt to the user.

The terminal may not be located near the scanning device, or communication signals may not be stable. When the terminal detects that no communication with the scanning device is made within a preset time period, the eighth module 208 reminds the user that a connection to the scanning device is needed, or sends a warning to the user, to update data of storage conditions of the products.

In implementations, the terminal 200 may further include a tenth module 210.

The tenth module 210 sends a lightening instruction to the scanning device based on an operation of the user about selecting a product in the containing apparatus and an identifier thereof.

In response to receiving the lightening instruction sent from the tenth module 210, the scanning device controls a lightening unit attached on the tag to emit a light according to the lightening instruction. For example, the user clicks an image corresponding to a tag that is presented in a display of the terminal. The tenth module 210 sends an identifier of the tag and a lightening instruction to the scanning device, instructing the scanning device to illuminate the corresponding tag according to the identifier. The scanning device sends out a scanning signal. The electronic tag uses a sensing antenna to sense and receive RF (radio frequency) power in a magnetic field formed by a RF signal of a certain frequency that is sent out from a reader of the scanning device, as a driver to cause the electronic tag to emit a light. As such, the electronic tag emits a light according to a selection operation of the user, to facilitate the user to find a corresponding product to which the tag is attached.

In implementations, the terminal 200 may further include a twelfth module 212.

The twelfth module 212 sends an instruction of setting a quality guarantee period of a product to an encoder according to an operation of the user for setting the quality guarantee period of the product.

A tag is reconfigured with an identifier by an encoder. Each time before a tag is attached to a product, an original tag may be reconfigured to be assigned with a new identifier for distinguishing from a previous product. When an identifier is reconfigured at the encoder, a quality guarantee period of a product corresponding to the identifier may be assigned. When the quality guarantee period of the product for the tag is needed to go through setting modification, the twelfth module 212 may send an instruction of setting the product quality guarantee period to the encoder according a setting operation of the user. The encoder modifies a corresponding setting for the quality guarantee period of the product according to the instruction. For example, when a quality guarantee period of an actual product is 6 months, and a product quality guarantee period that is stored in a tag is 3 months, the twelfth module 212 may send an instruction of setting the product quality guarantee period to the encoder. The encoder modifies the product quality guarantee period of the tag from 3 months to 6 months, and then attaches the tag onto a packet of the actual product.

In implementations, the instruction of setting a product quality guarantee period includes a correspondence relationship between a color of a tag and a product quality guarantee period.

Tags are set with different colors. Tags of different colors are set with different product quality guarantee periods. For example, colorful electronic tags are used, with colors including red, orange, yellow, green, pale, blue and purple. A product quality guarantee period of a red tag is set to be 1 day. A product quality guarantee period of an orange tag is set to be 2 days. A product quality guarantee period of a yellow tag is set to be 3 days. A product quality guarantee period of a green tag is set to be 4 days. A product quality guarantee period of a pale tag is set to be 1 week. A product quality guarantee period of a blue tag is set to be half month. A product quality guarantee period of a purple tag is set to be 1 month. Using different colored tags for representing different product quality guarantee periods can present the product quality guarantee periods associated with the tags very intuitively, and facilitate identification and usage by a user. When different colored tags are set for product quality guarantee periods, the twelfth module 212 also needs to send correspondence relationships between colors of the tags and the product quality guarantee periods, to ensure that the product quality guarantee periods stored in the tags are consistent with the colors of the tags.

In implementations, the terminal 200 may further include a fourteenth module 214, a sixteenth module 216, and an eighteenth module 218.

The fourteenth module 214 receives a current scanned list of identifiers sent by the scanning device. The sixteenth module 216 compares a historically stored list of identifiers with the current scanned list of identifiers, and labels an identifier that appears in the historically stored list of identifiers but not in the current scanned list of identifiers with a first status. The eighteenth module 218 stops a countdown calculation for a corresponding tag based on the identifier and the first status.

The scanning device scans tags of products in the containing apparatus on a regular basis. When the user takes a product out of the containing apparatus, the scanning device detects that a corresponding tag is not found in the containing apparatus, and sends a current scanned list of identifiers to the fourteenth module 214. The sixteenth module 216 compares the current list of identifiers that is received with a historically stored list of identifiers that is stored in the terminal, and finds that some historically stored identifiers are not found in the received identifiers. In this case, corresponding tags are labeled with a first status, indicating that the corresponding tags are not in the containing apparatus, and have been taken out by the user. In this case, the eighteenth module 218 controls and stops the fourth module 204 to perform respective countdown calculations for the corresponding tags, to save resources. For example, a user takes food out of a refrigerator. In this case, a countdown calculation for a tag corresponding to the food is stopped.

In implementations, the sixteenth module 216 compares a historically stored list of identifiers with the current scanned list of identifiers, and labels an identifier, which reappears in the current scanned list of identifiers and is labeled with a first status, with a second status. The eighteenth module 218 continues a countdown calculation for a corresponding tag based on the identifier and the second status.

After comparing the current scanned list of identifiers with the historically stored list of identifiers, the sixteenth module 216 detects that identifier(s) previously labeled with a first status reappear(s) in the current scanned list of identifiers, indicating that respective tags are placed back to the containing apparatus. In this case, the eighteenth module 218 controls the fourth module 204 to continue countdown calculations for the respective tags. When the countdown calculations are continued, using a current time after an update, thus implementing continuing a corresponding countdown operation of a tag according to an action of a user to place back a product.

In implementations, the terminal 200 may further include a twentieth module 220, twenty-second module 2022, and twenty-fourth module 224.

The twentieth module 220 receives identifier(s) that is/are recorded and a first status from the scanning device. The twenty-second module 2022 labels the recorded identifier(s) with the first status, and the twenty-fourth module 224 stops countdown calculation(s) for corresponding tag(s) based on the recorded identifier(s) and the first status.

The first status indicates that a corresponding tag is not in the containing apparatus. Being different from the method of comparing a current scanned list of identifiers with a historically stored list of identifiers, the scanning device directly sends recorded identifier(s) and a first status to the terminal when the recorded identifier(s) is/are not found in a scan, without the need for the terminal to compare the lists. This reduces the workload of the terminal and has a low consumption of the network flow. The twenty-fourth module 224 controls the fourth module 204 to stop a countdown calculation for a corresponding tag.

In implementations, the twentieth module 220 receives recorded identifiers and a second status from the scanning device, and the twenty-second module 222 labels the recorded identifiers with the second status. The twenty-fourth module 224 continues countdown calculations for corresponding tags based on the recorded identifiers and the second status.

A second status represents that a corresponding tag is placed back to the containing apparatus. Similarly, when the recorded identifiers are obtained again by scanning, the scanning device sends the second status, without the need for the terminal to compare a current scanned list of identifiers with a historically stored list of identifiers, thus reducing the workload of the terminal and having a low consumption of the network flow. The twenty-fourth module 224 controls the fourth module 204 to continue the countdown calculations for the corresponding tags.

In implementations, the terminal 200 may further include a twenty-sixth module 226 and a twenty-eighth module 228.

When conducting communications with the scanning device, the twenty-sixth module 226 obtains a tag scanning status of the scanning device. When the tag scanning status is an "update" status, the twenty-eighth module 228 requests the scanning device to send updated data.

If the scanning device does not find a recorded identifier in a scan, this indicates that a corresponding tag has been taken out, and conditions about product storage have been changed. The terminal needs to be informed to stop or continue a respective countdown calculation. In this case, the scanning device labels a tag scanning status as "update". When the twenty-sixth module 226 conducts communications with the scanning device, the twenty-sixth module 226 first detects the tag scanning status of the scanning device. If the tag scanning status is labeled as "update", the twenty-eighth module 228 requests the scanning device to send updated data. The updated data includes a current scanned list of identifiers, or identifier(s) that is/are labeled with a first status or a second status.

Figure 3:
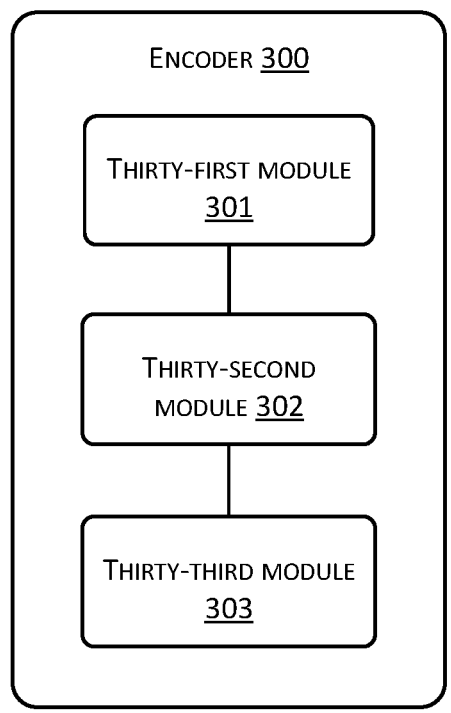
FIG. 3 shows a schematic structural diagram of an encoder for monitoring a quality guarantee period of a product according to the present disclosure.

FIG. 3 shows a schematic structural diagram of an encoder 300 for monitoring a quality guarantee period of a product. In implementations, the encoder 300 may include a thirty-first module 301.

The thirty-first module 301 assigns a new identifier to each tag. A scanning device scans a tag of a product to obtain an identifier of the tag and a product quality guarantee period corresponding to the identifier. When the identifier is a new identifier, the scanning device records an initial time at which the tag is scanned. The scanning device sends the identifier, the product quality guarantee period and the initial time to a terminal. The terminal performs monitoring of the quality guarantee period based on the product quality guarantee period and the initial time.

Information stored in a tag includes an identifier and a quality guarantee period of a product. The tag and the identifier (ID) mutually correspond to each other, and the identifier and the quality guarantee period of the product mutually correspond to each other. A quality guarantee period of a product is set for each tag. A tag is attached to a product, providing a product quality guarantee period corresponding to the product. A containing apparatus, which can be a refrigerator, a storage box, etc., is used for storing products. A product includes a product that needs to undergo a time monitoring. Examples include products that have quality guarantee periods, such as foods, medications, biological products, etc. The tag may be attached to the product through affixing, stapling, etc. The scanning device may scan the tag using methods such as RFID (Radio Frequency Identification), two-dimensional scanning, barcode scanning, image recognition, etc. A tag is reconfigured with an identifier via the encoder. Each time when a tag is attached to a product, the tag is placed into the encoder. The thirty-first module 301 reconfigures an original tag to provide a new identifier thereto, for making a distinction from a previous product.

In implementations, the encoder 300 may further include a thirty-second module 302 and a thirty-third module 303.

The thirty-second module 302 receives an instruction of setting a product quality guarantee period from the terminal. The thirty-third module 303 sets a product quality guarantee period corresponding to an identifier for a tag based on the instruction of setting the product quality guarantee period.

When a tag is reconfigured in the encoder, the tag may be provided with a product quality guarantee period corresponding to an identifier thereof. When the product quality guarantee period of the tag is needed to be modified in configuration, the terminal sends an instruction of setting the quality guarantee period to the thirty-second module 302 based on a setting operation of a user. The thirty-third module 303 performs a corresponding modification in configuration of the product quality guarantee period according to this instruction. For example, when a quality guarantee period of an actual product is 6 months and a product quality guarantee period that is stored a tag is 3 months, the terminal may be used to send an instruction for setting the product quality guarantee period to the thirty-second module 302, to control the thirty-third module 303 to modify the product quality guarantee period of the tag from 3 months to 6 months. The tag may then be attached to the package of the actual product.

In implementations, at least two tags have different colors. Different product quality guarantee periods are set for tags of different colors. The instruction of setting the product quality guarantee period includes a correspondence relationship between a color and the product quality guarantee period. The thirty-third module 303 is used for setting a product quality guarantee period corresponding to an identifier and a color of a tag for the tag according to an instruction of setting the product quality guarantee period.

Tags are set with different colors. Tags of different colors are set with different product quality guarantee periods. For example, colorful electronic tags are used, with colors including red, orange, yellow, green, pale, blue and purple. A product quality guarantee period of a red tag is set to be 1 day. A product quality guarantee period of an orange tag is set to be 2 days. A product quality guarantee period of a yellow tag is set to be 3 days. A product quality guarantee period of a green tag is set to be 4 days. A product quality guarantee period of a pale tag is set to be 1 week. A product quality guarantee period of a blue tag is set to be half month. A product quality guarantee period of a purple tag is set to be 1 month. Using different colored tags for representing different product quality guarantee periods can present the product quality guarantee periods associated with the tags very intuitively, and facilitate identification and usage by a user. When tags of different colors are configured with product quality guarantee periods, an instruction of setting a product quality guarantee period further needs to include correspondence relationships between the colors of the tags and the product quality guarantee periods, for ensuring that the product quality guarantee periods stored in the tags are consistent with the colors of the tags.

In implementations, the encoder 300 may include a plurality of containing cavities. Each containing cavity is used for placing tags of a same color. A respective color of each containing cavity corresponds to a color of a tag. The thirty-third module 303 is used for individually configuring tags in each containing cavity with respective product quality guarantee periods corresponding to individually identifiers and colors of the tags according to an instruction of setting a product quality guarantee period.

A product quality guarantee period corresponding to an identifier may preset in an electronic tag when manufacture. Different colors correspond to different quality guarantee periods. Tags are placed in the encoder according to the colors of the containing cavities, with a tag being placed into a containing cavity having a same color thereof. For example, a red tag is placed in a red containing cavity. This can therefore enable the user to start to use the tags very conveniently, without any setting. When an electronic tag is placed in the encoder, the encoder refreshes an identifier of the electronic tag, and refreshes a product quality guarantee period according to a location where the tag is placed. If the user is not satisfied with a predefined product quality guarantee period, the user can adjust a product quality guarantee period corresponding to the color of the tag via the terminal. The encoder can communicate with the terminal via a Bluetooth module or a WiFi module, and receive an instruction for updating configuration from the terminal.

Figure 4:
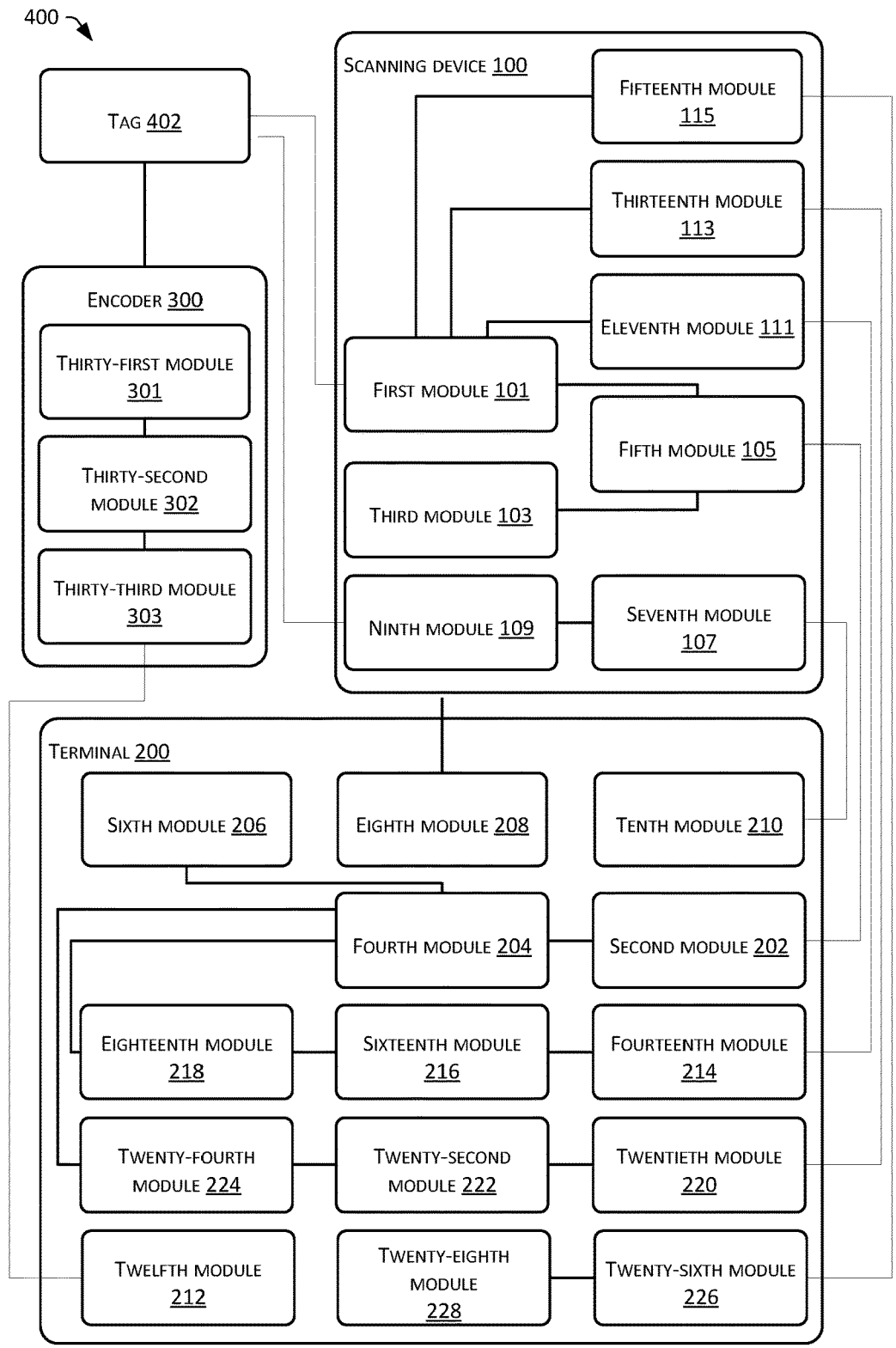
FIG. 4 shows a schematic structural diagram of a system for monitoring a quality guarantee period of a product according to the present disclosure.

FIG. 4 shows a schematic structural diagram of a system 400 for monitoring a quality guarantee period of a product. In implementations, the system 400 may include a scanning device 100 as shown in FIG. 1, and a terminal 200 as shown in FIG. 2.

The scanning device 100 may include a first module 101, a third module 103, and a fifth module 105. The terminal 200 may include a second module 202 and a fourth module 204.

The first module 101 scans a tag of a product to obtain an identifier of the tag and a product quality guarantee period corresponding to the identifier. In response to the identifier being a new identifier, the third module 103 records an initial time at which the tag is scanned. The fifth module 105 sends the identifier, the product quality guarantee period and the initial time to the second module 202. The fourth module 204 monitors the quality guarantee period based on the product quality guarantee period and the initial time.

In implementations, the fourth module 204 performs a countdown calculation based on the initial time and the product quality guarantee period corresponding to the identifier. When a calculation result of the countdown calculation reaches a predefined threshold, the fourth module 204 reminds a user that the product to which the tag is attached reaches the quality guarantee period based on the identifier. The following formula is used for the countdown calculation:

$$T_s = T_c + L - T_d$$

$T_s$ represents a remaining time, $T_c$ represents an initial time, L represents a quality guarantee period of a product, and $T_d$ represents a current time.

In implementations, the terminal 200 may further include a sixth module 206.

The sixth module 206 generates and displays a statistical list of quality guarantee periods based on a result of monitoring quality guarantee periods.

The sixth module 206 obtains respective calculation results of countdown of various identifiers base based on an identifier list, i.e., respective remaining times $T_s$, and displays a correspondence list of the identifiers and the remaining times, i.e., a statistical list of quality guarantee periods, based on query operations of a user, to facilitate the user to search and read conditions associated with quality guarantee periods of products.

In implementations, the terminal 200 may further include an eighth module 208.

In response to detecting that a time period of having no communications with the scanning device is greater than a preset time duration, the eighth module 208 provides a prompt to the user.

The terminal may not be located near the scanning device, or communication signals may not be stable. When the terminal detects that no communication with the scanning device is made within a preset time period, the eighth module 208 reminds the user that a connection to the scanning device is needed, or sends a warning to the user, to update data of storage conditions of the products.

In implementations, the terminal 200 may further include a tenth module 210. The scanning device further includes a seventh module 107 and a ninth module 109.

The tenth module 210 sends a lightening instruction to the seventh module 107 based on an operation of the user about selecting a product in the containing apparatus and an identifier thereof. The seventh module 107 receives the lightening instruction from the terminal, and the ninth module 109 controls an illumination unit that attaches to the tag to produce a light according to the lightening instruction.

After receiving the lightening instruction from the tenth module 210, the seventh module 107 controls the ninth module 109 to operate an illumination unit to which the tag is attached to produce a light according to the lightening instruction. For example, the user clicks an image corresponding to a tag displayed in a screen of the terminal, and the tenth module 210 sends an identifier of the tag and a lightening instruction to the seventh module 107. The ninth module 109 controls and sends out a scanning signal. An electronic tag uses a sensing antenna to sense and receive RF (radio frequency) energy in a magnetic field formed by a radio frequency signal having a certain frequency that is emitted by the scanning device using, to drive and cause the electronic tag to emit light. Therefore, the electronic tag emits light according to the selection operation of the user, to facilitate the user to find the corresponding product to which the tag is attached.

In implementations, the scanning device 100 may further include an eleventh module 111. The terminal further includes a fourteenth module 214, a sixteenth module 216, and an eighteenth module 218.

The first module scans tags of products inside a corresponding containing apparatus on a regular basis. The eleventh module 111 sends a current scanned list of identifiers to the fourteenth module 214. The fourteenth module 214 receives the current scanned list of identifiers from the scanning device. The sixteenth module 216 compares a historically stored list of identifiers with the current scanned list of identifiers, and labels an identifier that appears in the historically stored list of identifiers but not in the current scanned list of identifiers with a first status. The eighteenth module 218 stops a countdown calculation for a corresponding tag based on the identifier and the first status.

In implementations, the sixteenth module 216 compares the historically stored list of identifiers with the current scanned list of identifiers, and labels an identifier, which reappears in the current scanned list of identifiers and is labeled with a first status, with a second status. The eighteenth module 218 continues a countdown calculation for a corresponding tag based on the identifier and the second status.

A first status represents that a corresponding tag is not in the containing apparatus. A second status represents that a corresponding tag is put back into the containing apparatus. This implements stopping or continuing a countdown calculation for a corresponding tag based on an action of a user to put out or in a product.

In implementations, the scanning device 100 may further include a thirteenth module 113. The terminal further includes a twentieth module 220, a twenty-second module 2022, and a twenty-fourth module 224.

The first module 101 scans tags of products in the containing apparatus regularly. When no identifier that has been recorded is found from the scanning, the thirteenth module 113 sends identifier(s) that has/have been recorded and a first status to the twentieth module 220. The twentieth module 220 receives the recorded identifier(s) and the first status from the scanning device. The twenty-second module 2022 labels the recorded identifier(s) with the first status, and the twenty-fourth module 224 stops countdown calculation(s) for respective tag(s) based on the recorded identifier(s) and the first status.

In implementations, when a recorded identifier is obtained again by scanning, the thirteenth module 113 sends a second status and the recorded identifier to the twentieth module 220. The twentieth module 220 receives the recorded identifier and the second status from the scanning device. The twenty-second module 2022 labels the recorded identifier with the second status. The twenty-fourth module continues a countdown calculation for a corresponding tag based on the recorded identifier and the second status.

A first status represents that a corresponding tag is not in the containing apparatus. A second status represents a corresponding tag is put back to the containing apparatus. The scanning device sends a first status or a second status, without the need for the terminal to perform a comparison between a current scanned list of identifiers and a historically stored list of identifiers. As such, the workload of the terminal is reduced, with a low consumption of a network flow.

In implementations, the scanning device 100 may further include a fifteenth module 115. The terminal further includes a twenty-sixth module 226 and twenty-eight module 228. When no recorded identifier is found in a scan, the fifteenth module 115 labels a tag scanning status as "update" status. The twenty-sixth module 226 obtains the tag scanning status of the fifteenth module 115. If the tag scanning status is an "update" status, the twenty-eighth module 228 requests the scanning device to send updated data.

If the scanning device does not find a recorded identifier in a scan, this indicates that a corresponding tag has been taken out, and conditions about product storage have been changed. The terminal needs to be informed to stop or continue a respective countdown calculation. In this case, the fifteenth module 115 labels a tag scanning status as "update". When the twenty-sixth module 226 conducts communications with the scanning device, the twenty-sixth module 226 first detects the tag scanning status of the scanning device. If the tag scanning status is labeled as "update", the twenty-eighth module 228 requests the scanning device to send updated data. The updated data includes a current scanned list of identifiers, or identifier(s) that is/are labeled with a first status or a second status.

In implementations, the system 400 may further include an encoder 300 as shown in FIG. 3.

The encoder includes a thirty-first module 301. The thirty-first module sets a new identifier for each tag. A tag is reconfigured with an identifier via the encoder. Each time when a tag is attached to a product, the tag is placed into the encoder. The thirty-first module 301 reconfigures an original tag to provide a new identifier thereto, for making a distinction from a previous product.

In implementations, the encoder 300 may further include a thirty-second module 302 and a thirty-third module 303. The terminal 200 further includes a twelfth module 212.

The twelfth module 212 sends an instruction of setting a quality guarantee period of a product to the thirty-second module 302 according to an operation of the user for setting the quality guarantee period of the product. The thirty-third module 303 sets a product quality guarantee period corresponding to an identifier for a tag based on the instruction of setting the product quality guarantee period.

When a tag is reconfigured in the encoder, the tag may be provided with a product quality guarantee period corresponding to an identifier thereof. When the product quality guarantee period of the tag is needed to be modified in configuration, the twelfth module 212 sends an instruction of setting the quality guarantee period to the thirty-second module 302 according to a setting operation of a user. The thirty-third module 303 performs a corresponding modification in configuration of the product quality guarantee period according to this instruction.

In implementations, at least two tags have different colors. Different product quality guarantee periods are set for tags of different colors. The instruction of setting the product quality guarantee period includes a correspondence relationship between a color and the product quality guarantee period. The thirty-third module 303 sets a product quality guarantee period corresponding to an identifier and a color of a tag for the tag according to an instruction of setting the product quality guarantee period.

Tags are set with different colors. Tags of different colors are set with different product quality guarantee periods, thus presenting the product quality guarantee periods associated with the tags very intuitively, and facilitating identification and usage by a user. When tags of different colors are configured with product quality guarantee periods, an instruction of setting a product quality guarantee period further needs to include correspondence relationships between the colors of the tags and the product quality guarantee periods, for ensuring that the product quality guarantee periods stored in the tags are consistent with the colors of the tags.

In implementations, the encoder 300 may include a plurality of containing cavities. Each containing cavity is used for placing tags of a same color. A respective color of each containing cavity corresponds to a color of a tag. The thirty-third module 303 is used for individually configuring tags in each containing cavity with respective product quality guarantee periods corresponding to individually identifiers and colors of the tags according to an instruction of setting a product quality guarantee period.

A product quality guarantee period corresponding to an identifier may preset in an electronic tag when manufacture. Different colors correspond to different quality guarantee periods. Tags are placed in the encoder according to the colors of the containing cavities, with a tag being placed into a containing cavity having a same color thereof. For example, a red tag is placed in a red containing cavity. This therefore can enable the user to start to use the tags very conveniently, without any setting. When an electronic tag is placed in the encoder, the encoder refreshes an identifier of the electronic tag, and refreshes a product quality guarantee period according to a location where the tag is placed. If the user is not satisfied with a predefined product quality guarantee period, the user can adjust a product quality guarantee period corresponding to the color of the tag via the terminal.

In implementations, the scanning device 100 may be deployed inside the containing apparatus. The scanning device 100 communicates with the terminal via a communication unit. The communication unit is deployed outside the containing apparatus. The scanning device 100 couples with the communication unit via a data line.

The tag adopts an electronic tag, and the first module 101 may use a RFID reading module. An electronic tag is scanned using a RFID approach. When a product is placed into the containing apparatus, the first module 101 communicates with an electronic tag thereof by sending a radio frequency signal. All electronic tags receive the radio frequency signal, and send unique identifiers and corresponding product quality guarantee periods stored in respective chips using power obtained via an electric current that is sensed. This does not need to get in contact with products or use a specified gesture to scan the products. For example, a two-dimensional scanning method needs a scanning device to aim at a two-dimensional code for scanning. As such, a user gesture of scanning a tag of a product is skipped, and user operations are minimized. A tag is just needed to be attached when placing a product, and monitoring of quality guarantee periods is automatically performed without human intervention. However, since the scanning device needs to be deployed inside the containing apparatus, a problem of weak wireless signals for communications between the scanning device and the terminal may result. Therefore, the scanning device is coupled to a communication unit that is outside the containing apparatus via a data line, to avoid the problem of weakening wireless signals due to hindrance.

In implementations, the communication unit communicates with the terminal via Bluetooth or WiFi.

A transmission distance for Bluetooth is in a range of 10 meters. This is basically enough for a family. For a large-scale product containing system, the transmission distance of 10 meters is not enough. Therefore, WiFi may be used for conducting communications, which is more suitable for situations in which a large number of containing apparatuses for product storage are stored.

Figure 5:
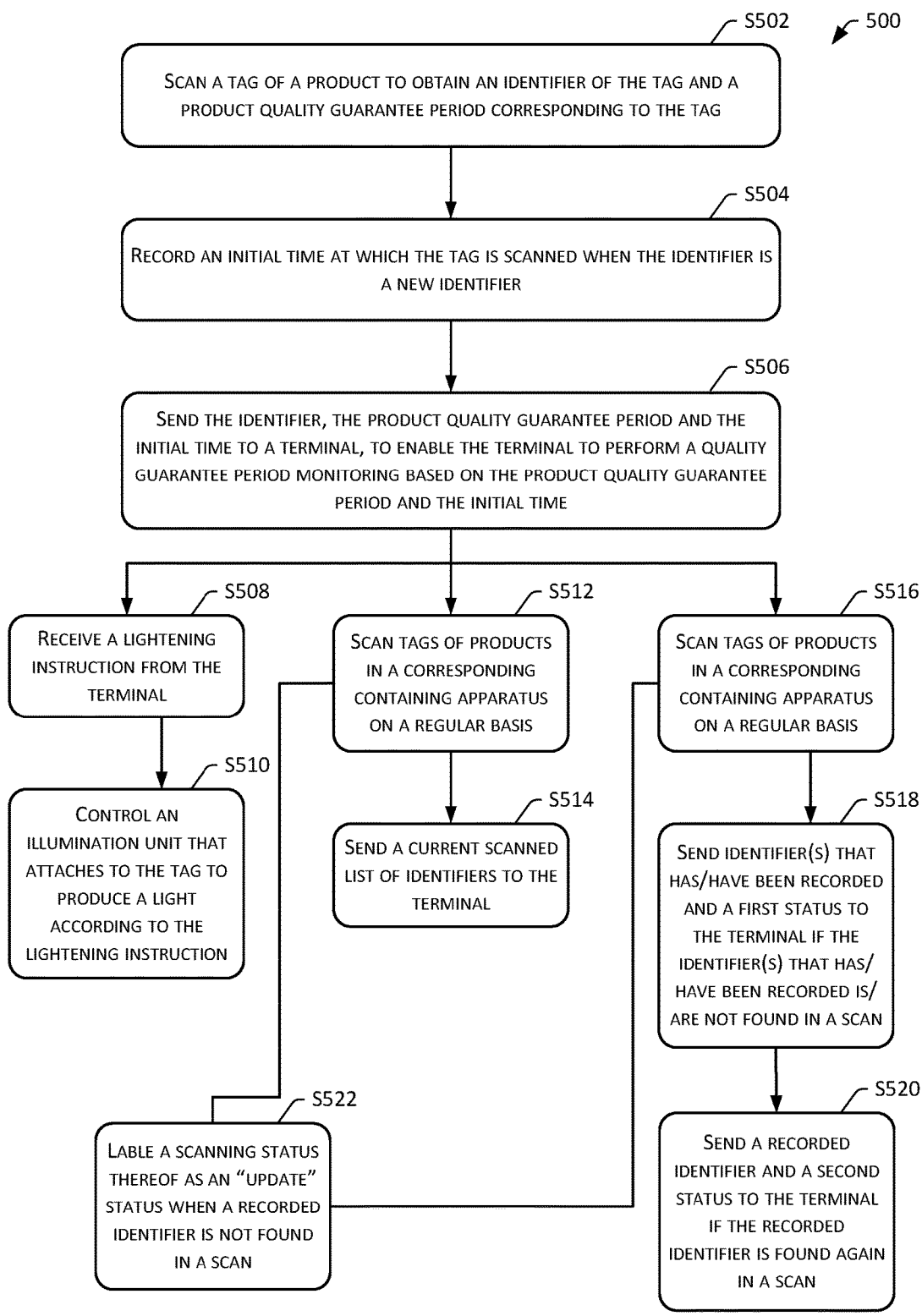
FIG. 5 shows a flowchart of a method of monitoring a product quality guarantee period in a scanning device according to the present disclosure.

FIG. 5 shows a flowchart of a method 500 for monitoring a quality guarantee period of a product in a scanning device in accordance with an aspect of the present disclosure. In implementations, the method 500 may include the following operations.

S502 scans a tag of a product to obtain an identifier of the tag and a product quality guarantee period corresponding to the tag.

S504 records an initial time at which the tag is scanned when the identifier is a new identifier.

S506 sends the identifier, the product quality guarantee period and the initial time to a terminal, to enable the terminal to perform a quality guarantee period monitoring based on the product quality guarantee period and the initial time.

Information stored in a tag includes an identifier and a quality guarantee period of a product. The tag and the identifier (ID) mutually correspond to each other, and the identifier and the quality guarantee period of the product mutually correspond to each other. A quality guarantee period of a product is set for each tag. A tag is attached to a product, providing a product quality guarantee period corresponding to the product. The scanning device can obtain an identifier and a product quality guarantee period included in a tag of a product when scanning the tag. When the scanning device finds that the identifier is an identifier that has not been recorded, this indicates that this identifier is put into a containing apparatus for the first time. In this case, the scanning device records an initial time at which the tag is scanned. The scanning device then sends the identifier, the product quality guarantee period and the initial time to a terminal, to enable the terminal to perform a quality guarantee period monitoring based on the product quality guarantee period and the initial time, and obtain a monitoring result corresponding to the identifier. The terminal may perform a countdown calculation based on the initial time and the product quality guarantee period. When a calculation result obtained by the countdown reaches a preset threshold, the terminal sends a reminder to a user that the product to which the tag is attached reaches the quality guarantee period based on the identifier. The containing apparatus is used for storing products, which may be a refrigerator, a storage box, etc. The scanning device is set up in the containing apparatus. The product includes a product that needs to undergo a time monitoring. Examples include products that have quality guarantee periods, such as foods, medications, biological products, etc. The tag may be attached to the product through affixing, stapling, etc. The scanning device may scan the tag using methods such as RFID (Radio Frequency Identification), two-dimensional scanning, barcode scanning, image recognition, etc.

In implementations, after sending the identifier, the product quality guarantee period and the initial time to the terminal at S506, the method 500 may further include the following operation.

S508 receives a lightening instruction from the terminal.

S510 controls an illumination unit that attaches to the tag to produce a light according to the lightening instruction.

The terminal sends a lightening instruction to the scanning device based on a user operation of selecting a product in the containing apparatus and a respective identifier. After receiving the lightening instruction from the terminal, the scanning device controls an illumination unit that attaches on the tag to produce a light according to the lightening instruction. For example, the user clicks an image corresponding to a tag displayed in a screen of the terminal, the terminal sends an identifier of the tag and a lightening instruction to the scanning device, to instruct the scanning device to illuminate the corresponding tag based on the identifier. After receiving the lightening instruction, the scanning device sends out a scanning signal. An electronic tag uses a sensing antenna to sense and receive RF (radio frequency) energy in a magnetic field formed by a radio frequency signal having a certain frequency that is emitted by the scanning device using, to drive and cause the electronic tag to emit light. Therefore, the electronic tag emits light according to the selection operation of the user, to facilitate the user to find the corresponding product to which the tag is attached.

In implementations, after sending the identifier, the product quality guarantee period and the initial time to the terminal at S506, the method 500 may further include the following operations.

S512 scans tags of products in a corresponding containing apparatus on a regular basis.

S514 sends a current scanned list of identifiers to the terminal.

After the scanning device sends the current scanned list of identifiers to the terminal, the terminal compares a historically stored list of identifiers with the current scanned list of identifiers, and labels identifier(s) that appear(s) in the historically stored list of identifiers and not in the current scanned list of identifiers with a first status. The first status represents that corresponding tag(s) is/are not in the containing apparatus. The terminal stops countdown calculation(s) for the corresponding tag(s) based on the identifier(s) and the first status. Furthermore, the terminal also compares the historically stored list of identifiers with the current scanned list of identifiers, and labels identifier(s), which reappear(s) in the historically stored list of identifiers and is/are labeled with a first status, with a second status. The second status represents that corresponding tag(s) is/are placed back into the containing apparatus. The terminal continues respective countdown calculation(s) for the corresponding tag(s) based on the identifier(s) and the second status. For example, the scanning device performs scanning regularly. When a user takes out a product from the containing apparatus, the scanning device detects that a corresponding tag is not in the containing apparatus, and sends a current scanned list of identifiers to the terminal. The terminal performs a comparison between the current scanned list of identifiers that is received and a historically stored list of identifiers, and detects that some historically stored identifiers are not found in the received identifiers. In this case, the terminal labels corresponding tags with a first status, indicating that the corresponding tags are not in the containing apparatus and have been taken out by the user. Countdown calculations for the corresponding tags are stopped at that time to save resources. If an identifier which is labeled with a first status reappears in the current scanned list of identifiers after the comparison between the current scanned list of identifiers and the historically stored list of identifiers, this indicates that a tag thereof is returned back to the containing apparatus. In this case, a countdown calculation for the corresponding tag is continued. As such, continuing or stopping a countdown calculation for a corresponding tag is implemented based on an action of a user for taking a product from or into the containing apparatus. For example, a user takes a food product from a refrigerator, and puts it back into the refrigerator after eating a portion thereof. Under this situation, a countdown calculation for a corresponding tag of the food product is stopped or continued.

In implementations, after sending the identifier, the product quality guarantee period and the initial time to the terminal at S506, the method 500 may further include the following operations.

S516 scans tags of products in a corresponding containing apparatus on a regular basis.

S518 sends identifier(s) that has/have been recorded and a first status to the terminal if the identifier(s) that has/have been recorded is/are not found in a scan.

In this case, the first status represents that corresponding tag(s) is/are not in the containing apparatus. In response to receiving the identifier(s) and the first status, the terminal labels the recorded identifier(s) with the first status. The terminal stops a countdown calculation for the corresponding tag(s) based on the recorded identifier(s) and the first status. As being different from an approach that uses a comparison between a current scanned list of identifiers and a historically stored list of identifiers, the scanning device directly sends recorded identifier(s) and the first status to the terminal when recorded identifier(s) is/are found in a scan, without the need of the terminal to perform the comparison. This reduces the workload of the terminal, having a low consumption of a network flow.

In implementations, after sending the recorded identifier(s) and the first status to the terminal at S518, the method 500 may further include the following operation.

S520 sends a recorded identifier and a second status to the terminal if the recorded identifier is found again in a scan.

In this case, the second status represents that a tag thereof is put back into the containing apparatus. In response to receiving the identifier and the second status, the terminal labels the recorded identifier with the second status. The terminal continues a countdown calculation of the corresponding tag based on the recorded identifier and the second status. Similarly, the second status is sent from the scanning device, and the terminal does not need to perform a comparison between a current scanned list of identifiers and a historically stored list of identifiers, thus reducing the workload of the terminal and having a low consumption of a network flow.

In implementations, after scanning the tags of the products in the corresponding containing apparatus, the method 500 may further include the following operation.

S522 labels a scanning status thereof as an "update" status when a recorded identifier is not found in a scan.

In this case, when the scanning device does not find an identifier that has been recorded in a scan, this indicates that a corresponding tag has been taken out of the containing apparatus, and conditions of product storage have been changed. A notification to the terminal for stopping or continuing a countdown calculation is needed. In this case, the scanning device labels a tag scanning status of the scanning device as "update". When the terminal conducts communications and connections with the scanning device, the terminal first examines the tag scanning status of the scanning device. If the tag scanning status is labeled as "update", the terminal requests the scanning device to send updated data. The updated data includes a current scanned list of identifiers, or identifier(s) labeled with a first status or a second status.

Figure 6:
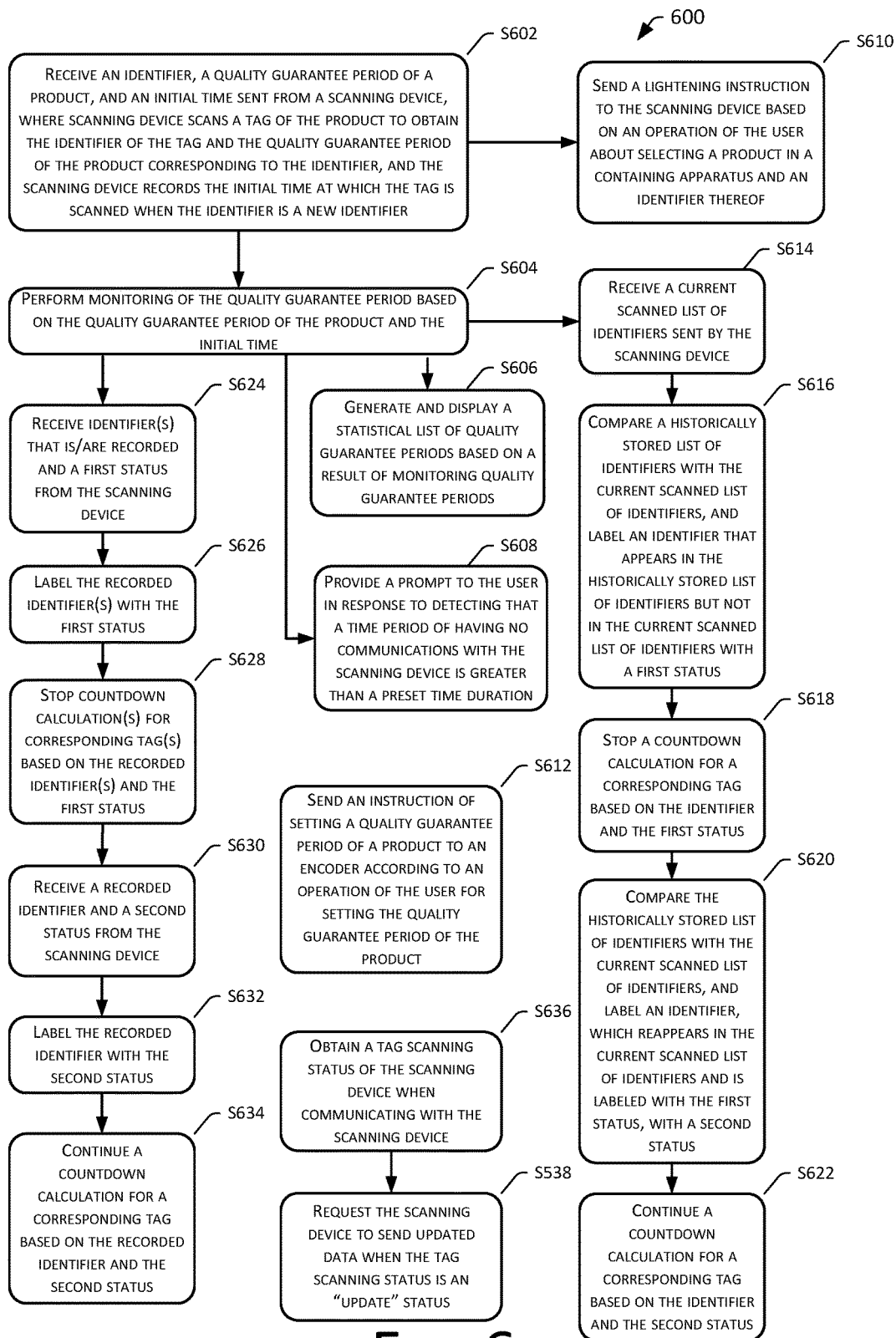
FIG. 6 shows a flowchart of a method of monitoring a quality guarantee period of a product in a terminal according to the present disclosure.

FIG. 6 shows a flowchart of a method 600 for monitoring a quality guarantee period of a product in a terminal in accordance with an aspect of the present disclosure. In implementations, the method 600 may include the following operations.

S602 receives an identifier, a quality guarantee period of a product, and an initial time sent from a scanning device. The scanning device scans a tag of the product to obtain the identifier of the tag and the quality guarantee period of the product corresponding to the identifier. When the identifier is a new identifier, the scanning device records the initial time at which the tag is scanned.

S604 performs monitoring of the quality guarantee period based on the quality guarantee period of the product and the initial time.

Information stored in a tag includes an identifier and a quality guarantee period of a product. The tag and the identifier (ID) mutually correspond to each other, and the identifier and the quality guarantee period of the product mutually correspond to each other. A quality guarantee period of a product is set for each tag. A tag is attached to a product, providing a product quality guarantee period corresponding to the product. A scanning device can obtain an identifier and a quality guarantee period of a product when scanning a tag on the product. When the scanning device detects the identifier as an identifier that has not been recorded, this indicates that this tag is placed into a containing apparatus for the first time. In this case, the scanning device records an initial time at which the tag is scanned. The scanning device then sends the identifier, the quality guarantee period of the product and the initial time to a terminal. The terminal is used for monitoring the quality guarantee period based on the quality guarantee period of the product and the initial time. The containing apparatus, which can be a refrigerator, a storage box, etc., is used for storing products. The product includes a product that needs to undergo a time monitoring. Examples include products that have quality guarantee periods, such as foods, medications, biological products, etc. The tag may be attached to the product through affixing, stapling, etc. The scanning device may scan the tag using methods such as RFID (Radio Frequency Identification), two-dimensional scanning, barcode scanning, image recognition, etc. The terminal can be a device that is capable of conducting communications and performing computations, which includes a mobile phone, a tablet computer, a desktop computer, etc.

In implementations, monitoring the quality guarantee period includes performing a countdown calculation based on the initial time and the quality guarantee period of the product corresponding to the identifier; and reminding a user that the product to which the tag is attached has reached the quality guarantee period based on the identifier when a calculation result of the countdown calculation reaches a preset threshold.

In implementations, the following formula is used for the countdown calculation:

$$T_s = T_c + L - T_d$$

$T_s$ represents a remaining time, $T_c$ represents an initial time, L represents a quality guarantee period of a product, and $T_d$ represents a current time.

The current time $T_d$ refers to current time information obtained by the terminal using a clock. The calculation result of the countdown calculation refers to the remaining time $T_s$. When the remaining time $T_s$ obtained from the calculation is less than the preset threshold, e.g., less than one day, the terminal reminds the user that the corresponding tag is close to the quality guarantee period of the product. For example, a serial number or name of the tag that is expired is displayed via a screen. A remaining valid time period for the tag may also be displayed.

In implementations, after performing the monitoring of the quality guarantee period based on the quality guarantee period of the product and the initial time at S604, the method further includes:

S606 generates and displays a statistical list of quality guarantee periods based on a result of monitoring quality guarantee periods.

The terminal obtains respective calculation results of countdown of various identifiers base based on an identifier list, i.e., respective remaining times $T_s$, and displays a correspondence list of the identifiers and the remaining times, i.e., a statistical list of quality guarantee periods, based on query operations of a user, to facilitate the user to search and read conditions associated with quality guarantee periods of products that are stored.

In implementations, the method 600 may further include the following operation.

S608 provides a prompt to the user in response to detecting that a time period of having no communications with the scanning device is greater than a preset time duration.

The terminal may not be located near the scanning device, or communication signals may not be stable. When the terminal detects that no communication with the scanning device is made within a preset time period, the eighth module 208 reminds the user that a connection to the scanning device is needed, or sends a warning to the user, to update data of storage conditions of the products.

In implementations, after receiving the identifier, the quality guarantee period of the product, and the initial time sent from the scanning device at S602, the method 600 may further include the following operations.

S610 sends a lightening instruction to the scanning device based on an operation of the user about selecting a product in a containing apparatus and an identifier thereof.

In response to receiving the lightening instruction sent from the terminal, the scanning device controls a lightening unit attached on the tag to emit a light according to the lightening instruction. For example, the user clicks an image corresponding to a tag that is presented in a display of the terminal. The terminal sends an identifier of the tag and a lightening instruction to the scanning device, instructing the scanning device to illuminate the corresponding tag according to the identifier. The scanning device sends out a scanning signal. The electronic tag uses a sensing antenna to sense and receive RF (radio frequency) power in a magnetic field formed by a RF signal of a certain frequency that is sent out from a reader of the scanning device, as a driver to cause the electronic tag to emit a light. As such, the electronic tag emits a light according to a selection operation of the user, to facilitate the user to find a corresponding product to which the tag is attached.

In implementations, the method 600 may further include the following operation.

S612 sends an instruction of setting a quality guarantee period of a product to an encoder according to an operation of the user for setting the quality guarantee period of the product.

A tag is reconfigured with an identifier by an encoder. Each time before a tag is attached to a product, an original tag may be reconfigured to be assigned with a new identifier for distinguishing from a previous product. When an identifier is reconfigured at the encoder, a quality guarantee period of a product corresponding to the identifier may be assigned. When the quality guarantee period of the product for the tag is needed to go through setting modification, the terminal sends an instruction of setting a quality guarantee period to the encoder according to a setting operation of the user. The encoder modifies a corresponding setting for the quality guarantee period of the product according to the instruction. For example, when a quality guarantee period of an actual product is 6 months, and a product quality guarantee period that is stored in a tag is 3 months, the terminal may send an instruction of setting the product quality guarantee period to the encoder. The encoder modifies the product quality guarantee period of the tag from 3 months to 6 months, and then attaches the tag onto a packet of the actual product.

In implementations, the instruction of setting a product quality guarantee period includes a correspondence relationship between a color of a tag and a product quality guarantee period.

Tags are set with different colors. Tags of different colors are set with different product quality guarantee periods, thus presenting the product quality guarantee periods associated with the tags very intuitively, and facilitating identification and usage by a user. When different colored tags are set for product quality guarantee periods, the instruction of setting the quality guarantee period that is sent by the terminal also needs to include correspondence relationships between colors of the tags and the product quality guarantee periods, to ensure that the product quality guarantee periods stored in the tags correspond to the colors of the tags.

After performing the monitoring of the quality guarantee period based on the quality guarantee period of the product and the initial time at S604, the method 600 may further include the following operations.

S614 receives a current scanned list of identifiers sent by the scanning device.

S616 compares a historically stored list of identifiers with the current scanned list of identifiers, and labels an identifier that appears in the historically stored list of identifiers but not in the current scanned list of identifiers with a first status.

S618 stops a countdown calculation for a corresponding tag based on the identifier and the first status.

The scanning device scans tags of products in the containing apparatus on a regular basis. When the user takes a product out of the containing apparatus, the scanning device detects that a corresponding tag is not found in the containing apparatus, and sends a current scanned list of identifiers to the terminal. The terminal compares the current list of identifiers that is received with a historically stored list of identifiers that is stored in the terminal, and finds that some historically stored identifiers are not found in the received identifiers. In this case, corresponding tags are labeled with a first status, indicating that the corresponding tags are not in the containing apparatus, and have been taken out by the user. In this case, the terminal stops respective countdown calculations for the corresponding tags, to save resources. For example, a user takes food out of a refrigerator. In this case, a countdown calculation for a tag corresponding to the food is stopped.

In implementations, after stopping the countdown calculation for the corresponding tag based on the identifier and the first status at S618, the method 600 may further include the following operations.

S620 compares the historically stored list of identifiers with the current scanned list of identifiers, and labels an identifier, which reappears in the current scanned list of identifiers and is labeled with the first status, with a second status.

S622 continues a countdown calculation for a corresponding tag based on the identifier and the second status.

After comparing the current scanned list of identifiers with the historically stored list of identifiers, the terminal detects that identifier(s) previously labeled with the first status reappear(s) in the current scanned list of identifiers, indicating that respective tags are placed back to the containing apparatus. In this case, the terminal continues countdown calculations for the respective tags, using a current time after an update, thus implementing continuing a corresponding countdown operation of a tag according to an action of a user to place back a product.

In implementations, after performing the monitoring of the quality guarantee period based on the quality guarantee period of the product and the initial time at S604, the method 600 may further include the following operations.

S624 receives identifier(s) that is/are recorded and a first status from the scanning device.

S626 labels the recorded identifier(s) with the first status.

S628 stops countdown calculation(s) for corresponding tag(s) based on the recorded identifier(s) and the first status.

The first status indicates that a corresponding tag is not in the containing apparatus. Being different from the method of comparing a current scanned list of identifiers with a historically stored list of identifiers, the scanning device directly sends recorded identifier(s) and a first status to the terminal when the recorded identifier(s) is/are not found in a scan, without the need for the terminal to compare the lists. This reduces the workload of the terminal and has a low consumption of the network flow.

In implementations, after stopping the countdown calculation(s) for the corresponding tag(s) based on the recorded identifier(s) and the first status at S628, the method 600 may further include the following operations.

S630 receives a recorded identifier and a second status from the scanning device.

S632 labels the recorded identifier with the second status.

S634 continues a countdown calculation for a corresponding tag based on the recorded identifier and the second status.

A second status represents that a corresponding tag is placed back to the containing apparatus. Similarly, when the recorded identifiers are obtained again by scanning, the scanning device sends the second status, without the need for the terminal to compare a current scanned list of identifiers with a historically stored list of identifiers, thus reducing the workload of the terminal and having a low consumption of the network flow.

In implementations, the method 600 may further include the following operations.

S636 obtains a tag scanning status of the scanning device when communicating with the scanning device.

S638 requests the scanning device to send updated data when the tag scanning status is an "update" status.

If the scanning device does not find a recorded identifier in a scan, this indicates that a corresponding tag has been taken out, and conditions about product storage have been changed. The terminal needs to be informed to stop or continue a respective countdown calculation. In this case, the scanning device labels a tag scanning status as "update". When the terminal conducts communications with the scanning device, the terminal first detects the tag scanning status of the scanning device. If the tag scanning status is labeled as "update", the terminal requests the scanning device to send updated data. The updated data includes a current scanned list of identifiers, or identifier(s) that is/are labeled with a first status or a second status.

Figure 7:
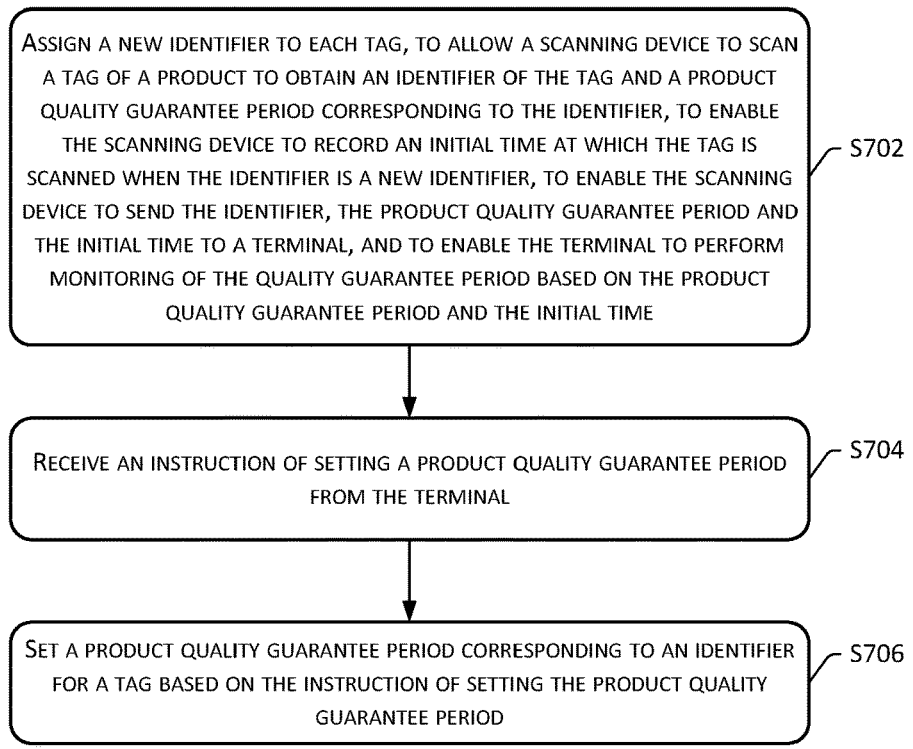
FIG. 7 shows a flowchart of a method of monitoring a quality guarantee period of a product in an encoder according to the present disclosure.

FIG. 7 shows a flowchart of a method 700 for monitoring a quality guarantee period of a product in an encoder in accordance with an aspect of the present disclosure. In implementations, the method 700 may include the following operations.

S702 assigns a new identifier to each tag, to allow a scanning device to scan a tag of a product to obtain an identifier of the tag and a product quality guarantee period corresponding to the identifier, to enable the scanning device to record an initial time at which the tag is scanned when the identifier is a new identifier, to enable the scanning device to send the identifier, the product quality guarantee period and the initial time to a terminal, and to enable the terminal to perform monitoring of the quality guarantee period based on the product quality guarantee period and the initial time.

Information stored in a tag includes an identifier and a quality guarantee period of a product. The tag and the identifier (ID) mutually correspond to each other, and the identifier and the quality guarantee period of the product mutually correspond to each other. A quality guarantee period of a product is set for each tag. A tag is attached to a product, providing a product quality guarantee period corresponding to the product. A containing apparatus, which can be a refrigerator, a storage box, etc., is used for storing products. A product includes a product that needs to undergo a time monitoring. Examples include products that have quality guarantee periods, such as foods, medications, biological products, etc. The tag may be attached to the product through affixing, stapling, etc. The scanning device may scan the tag using methods such as RFID (Radio Frequency Identification), two-dimensional scanning, barcode scanning, image recognition, etc. A tag is reconfigured with an identifier via the encoder. Each time when a tag is attached to a product, the tag is placed into the encoder. The encoder reconfigures an original tag to provide a new identifier thereto, for making a distinction from a previous product.

In implementations, the method 700 may further include the following operations.

S704 receives an instruction of setting a product quality guarantee period from the terminal.

S706 sets a product quality guarantee period corresponding to an identifier for a tag based on the instruction of setting the product quality guarantee period.

When a tag is reconfigured in the encoder, the tag may be provided with a product quality guarantee period corresponding to an identifier thereof. When the product quality guarantee period of the tag is needed to be modified in configuration, the terminal sends an instruction of setting the quality guarantee period to the encoder based on a setting operation of a user. The encoder performs a corresponding modification in configuration of the product quality guarantee period according to this instruction. For example, when a quality guarantee period of an actual product is 6 months and a product quality guarantee period that is stored a tag is 3 months, the terminal may be used to send an instruction for setting the product quality guarantee period to the encoder, to control the encoder to modify the product quality guarantee period of the tag from 3 months to 6 months. The tag may then be attached to the package of the actual product.

In implementations, at least two tags have different colors. Different product quality guarantee periods are set for tags of different colors. The instruction of setting the product quality guarantee period includes a correspondence relationship between a color and the product quality guarantee period. Setting the product quality guarantee period corresponding to the identifier for the tag based on the instruction of setting the product quality guarantee period at S706 may include setting the product quality guarantee period corresponding to the identifier and a color of the tag for the tag according to the instruction of setting the product quality guarantee period.

A product quality guarantee period corresponding to an identifier may preset in an electronic tag when manufacture. Different colors correspond to different quality guarantee periods. Tags are placed in the encoder according to the colors of the containing cavities, with a tag being placed into a containing cavity having a same color thereof. For example, a red tag is placed in a red containing cavity. This can therefore enable the user to start to use the tags very conveniently, without any setting. When an electronic tag is placed in the encoder, the encoder refreshes an identifier of the electronic tag, and refreshes a product quality guarantee period according to a location where the tag is placed. If the user is not satisfied with a predefined product quality guarantee period, the user can adjust a product quality guarantee period corresponding to the color of the tag via the terminal.

Figure 8:
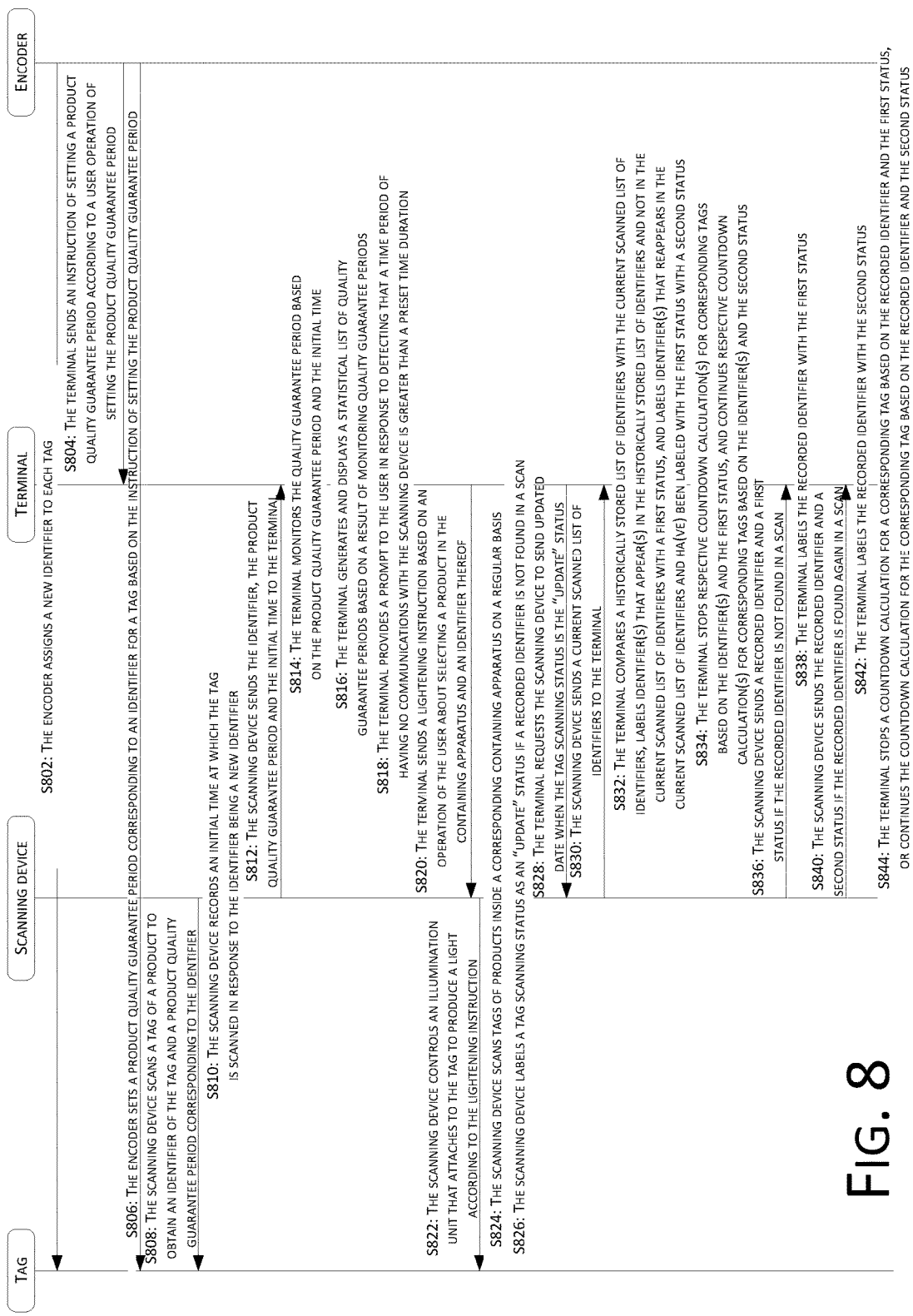
FIG. 8 shows a flowchart of a method of monitoring a quality guarantee period of a product according to one aspect of the present disclosure.

FIG. 8 shows a flowchart of a method 800 for monitoring a quality guarantee period of a product in accordance with an aspect of the present disclosure. In implementations, the method 800 may include the following operations.

At S802, an encoder assigns a new identifier to each tag.

A tag is reconfigured with an identifier via an encoder. Each time when a tag is attached to a product, the tag is placed into the encoder. The encoder reconfigures an original tag to provide a new identifier thereto, for making a distinction from a previous product.

In implementations, the method 800 may further include the following operations.

At S804, a terminal sends an instruction of setting a quality guarantee period of a product to the encoder according to an operation of the user for setting the quality guarantee period of the product.

At S806, the encoder sets a product quality guarantee period corresponding to an identifier for a tag based on the instruction of setting the product quality guarantee period.

When a tag is reconfigured in the encoder, the tag may be provided with a product quality guarantee period corresponding to an identifier thereof. When the product quality guarantee period of the tag is needed to be modified in configuration, the terminal sends an instruction of setting the quality guarantee period to the encoder according to a setting operation of a user. The encoder performs a corresponding modification in configuration of the product quality guarantee period according to this instruction.

In implementations, at least two tags have different colors. Different product quality guarantee periods are set for tags of different colors. The instruction of setting the product quality guarantee period includes a correspondence relationship between a color and the product quality guarantee period. The encoder sets a product quality guarantee period corresponding to an identifier and a color of a tag for the tag according to an instruction of setting the product quality guarantee period.

Tags are set with different colors. Tags of different colors are set with different product quality guarantee periods, thus presenting the product quality guarantee periods associated with the tags very intuitively, and facilitating identification and usage by a user. When tags of different colors are configured with product quality guarantee periods, an instruction of setting a product quality guarantee period further needs to include correspondence relationships between the colors of the tags and the product quality guarantee periods, for ensuring that the product quality guarantee periods stored in the tags are consistent with the colors of the tags.

In implementations, the method 800 may further include the following operations.

At S808, a scanning device scans a tag of a product to obtain an identifier of the tag and a product quality guarantee period corresponding to the identifier.

At S810, the scanning device records an initial time at which the tag is scanned in response to the identifier being a new identifier.

At S812, the scanning device sends the identifier, the product quality guarantee period and the initial time to the terminal.

At S814, the terminal monitors the quality guarantee period based on the product quality guarantee period and the initial time.

In implementations, the terminal performs a countdown calculation based on the initial time and the product quality guarantee period corresponding to the identifier. When a calculation result of the countdown calculation reaches a predefined threshold, the terminal reminds a user that the product to which the tag is attached reaches the quality guarantee period based on the identifier. The following formula is used for the countdown calculation:

$$T_s = T_c + L - T_d$$

$T_s$ represents a remaining time, $T_c$ represents an initial time, L represents a quality guarantee period of a product, and $T_d$ represents a current time.

In implementations, the method further includes:

At S816, the terminal generates and displays a statistical list of quality guarantee periods based on a result of monitoring quality guarantee periods.

The terminal obtains respective calculation results of countdown of various identifiers base based on an identifier list, i.e., respective remaining times $T_s$, and displays a correspondence list of the identifiers and the remaining times, i.e., a statistical list of quality guarantee periods, based on query operations of a user, to facilitate the user to search and read conditions associated with quality guarantee periods of products.

In implementations, the method 800 may further include the following operation.

At S818, the terminal provides a prompt to the user in response to detecting that a time period of having no communications with the scanning device is greater than a preset time duration.

The terminal may not be located near the scanning device, or communication signals may not be stable. When the terminal detects that no communication with the scanning device is made within a preset time period, the terminal reminds the user that a connection to the scanning device is needed, or sends a warning to the user, to update data.

In implementations, the method 800 may further include the following operations.

At S820, the terminal sends a lightening instruction to the scanning device based on an operation of the user about selecting a product in the containing apparatus and an identifier thereof.

At S822, the scanning device controls an illumination unit that attaches to the tag to produce a light according to the lightening instruction.

The user clicks an image corresponding to a tag displayed in a screen of the terminal, and the terminal sends an identifier of the tag and a lightening instruction to a scanning module. The scanning module controls and sends out a scanning signal. An electronic tag uses a sensing antenna to sense and receive RF (radio frequency) energy in a magnetic field formed by a radio frequency signal having a certain frequency that is emitted by the scanning device using, to drive and cause the electronic tag to emit light. Therefore, the electronic tag emits light according to the selection operation of the user, to facilitate the user to find the corresponding product to which the tag is attached.

In implementations, the method 800 may further include the following operations.

At S824, the scanning device scans tags of products inside a corresponding containing apparatus on a regular basis.

At S826, the scanning device labels a tag scanning status as an "update" status if a recorded identifier is not found in a scan.

At S828, the terminal requests the scanning device to send updated date when the tag scanning status is the "update" status.

If the scanning device does not find a recorded identifier in a scan, this indicates that a corresponding tag has been taken out, and conditions about product storage have been changed. The terminal needs to be informed to stop or continue a respective countdown calculation. In this case, the scanning device labels a tag scanning status as "update". When the terminal conducts communications with the scanning device, the terminal first detects the tag scanning status of the scanning device. If the tag scanning status is labeled as "update", the terminal requests the scanning device to send updated data. The updated data includes a current scanned list of identifiers, or identifier(s) that is/are labeled with a first status or a second status.

At S830, the scanning device sends a current scanned list of identifiers to the terminal.

At S832, the terminal compares a historically stored list of identifiers with the current scanned list of identifiers, labels identifier(s) that appear(s) in the historically stored list of identifiers and not in the current scanned list of identifiers with a first status, and labels identifier(s) that reappears in the current scanned list of identifiers and ha(ve) been labeled with the first status with a second status.

At S834, the terminal stops respective countdown calculation(s) for corresponding tags based on the identifier(s) and the first status, and continues respective countdown calculation(s) for corresponding tags based on the identifier(s) and the second status.

A first status represents that a corresponding tag is not in the containing apparatus. A second status represents that a corresponding tag is returned back to the containing apparatus. This implements stopping or continuing a countdown calculation for a corresponding tag based on an action of taking out or in a product by a user.

In implementations, the method 800 may further include the following operations.

At S836, the scanning device sends a recorded identifier and a first status if the recorded identifier is not found in a scan.

At S838, the terminal labels the recorded identifier with the first status.

At S840, the scanning device sends the recorded identifier and a second status if the recorded identifier is found again in a scan.

At S842, the terminal labels the recorded identifier with the second status.

At S844, the terminal stops a countdown calculation for a corresponding tag based on the recorded identifier and the first status, or continues the countdown calculation for the corresponding tag based on the recorded identifier and the second status.

A first status represents that a corresponding tag is not in the containing apparatus. A second status represents that a corresponding tag is returned back to the containing apparatus. Being different from the method of performing a comparison between a current scanned list of identifiers and a historically stored list of identifiers, the scanning device directly sends the recorded identifier, and the first status or the second status to the terminal, without the need for the terminal to perform the comparison. As such, the workload of the terminal is reduced, with a low consumption of a network flow.

Figure 9:
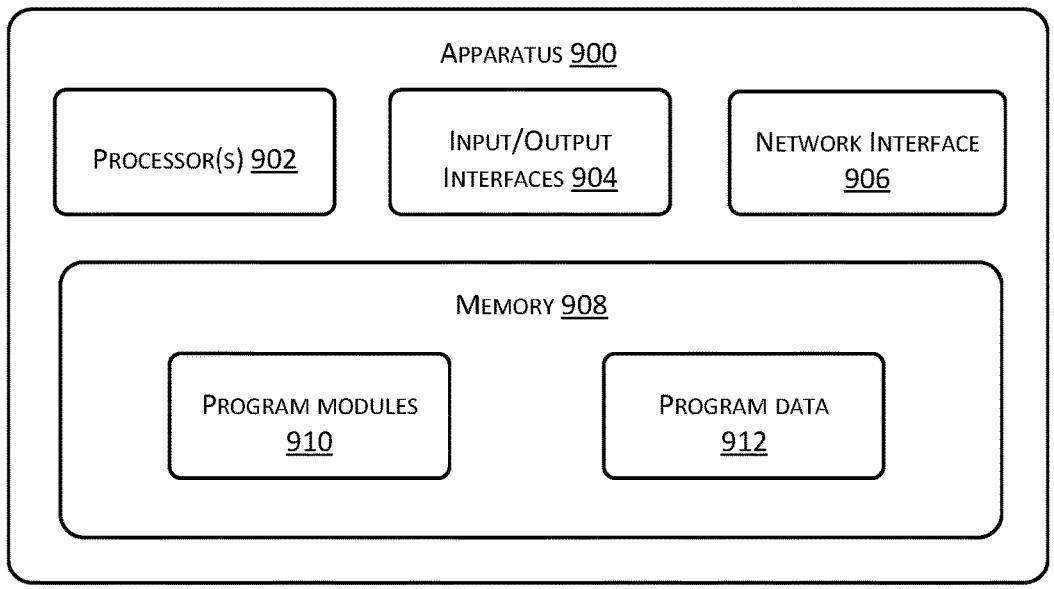
FIG. 9 shows an example apparatus as described in FIGS. 1-3 in more detail.

FIG. 9 shows a structural diagram of an example apparatus 900, such as the apparatuses or devices described in FIGS. 1-3, in further detail. In implementations, the example apparatus 900 may include one or more processors 902, an input/output interface 904, a network interface 906, and memory 908.

The memory 908 may include a form of processor-readable media or computer-readable media such as a volatile memory, a random access memory (RAM) and/or a non-volatile memory, for example, a read-only memory (ROM) or a flash RAM. The memory 908 is an example of a processor-readable media or computer-readable media.

The processor-readable media or computer readable media may include a volatile or non-volatile type, a removable or non-removable media, which may achieve storage of information using any method or technology. The information may include a processor-readable or computer-readable instruction, a data structure, a program module or other data. Examples of processor-storage media or computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the processor-readable media and the computer readable media do not include transitory media, such as modulated data signals and carrier waves.

In implementations, the memory 908 may include program modules 910 and program data 912. Depending on which apparatus or device the example apparatus 900 corresponds to, program modules 910 may include any of the modules as described in the foregoing description.

It is apparent to one skilled in art that the present disclosure is not limited to the details of the exemplary embodiments as described above. The present disclosure can be implemented in other forms without departing the spirit and the basic features of the present disclosure. Therefore, regardless of which point of view, the embodiments are considered as exemplary, and not limiting. The scope of the present disclosure is defined by the appended claims and not the above description. Therefore, all variations having meanings and scopes that are equivalent to the appended claims shall be covered by the present disclosure. Drawing labels in the appended claims should not be construed as limitations to the corresponding appended claims. Furthermore, a term "including" apparently does not exclude other units or acts, and a singular form does not exclude a plural form. Multiple units or apparatuses described in the appended apparatus claims can be implemented by a single unit or apparatus using a software or hardware component. Terms such as first, second, etc., are used for representing names, and do not imply any particular order.

The present disclosure may further be understood with clauses as follows.

Clause 1: A method for monitoring a quality guarantee period of a product in a scanning device, the method comprising: scanning a tag of a product and obtaining an identifier of the tag and a product quality guarantee period corresponding to the identifier; recording an initial time at which the tag is scanned in response to the identifier being a new identifier; and sending the identifier, the product quality guarantee period and the initial time to a terminal to enable the terminal to perform a quality guarantee period monitoring based on the product quality guarantee period and the initial time.

Clause 2: The method of Clause 1, wherein after sending the identifier, the product quality guarantee period and the initial time to the terminal, the method further comprises: receiving a lightening instruction from the terminal; and controlling an illumination unit that attaches to the tag to produce a light according to the lightening instruction.

Clause 3: The method of Clause 1 or 2, wherein after sending the identifier, the product quality guarantee period and the initial time to the terminal, the method further comprises: regularly scanning tags of products in a corresponding containing apparatus; and sending a current scanned list of identifiers to the terminal.

Clause 4: The method of Clause 1 or 2, wherein after sending the identifier, the product quality guarantee period and the initial time to the terminal, the method further comprises: regularly scanning tags of products in a corresponding containing apparatus; and sending identifier(s) that has/have been recorded and a first status to the terminal if the identifier(s) that has/have been recorded is/are not found in a scan.

Clause 5: The method of Clause 4, wherein after sending the identifier(s) that has/have been recorded and the first status to the terminal, the method further comprises sending a recorded identifier and a second status to the terminal if the recorded identifier is found again in a scan.

Clause 6: The method of any one of Clauses 1-5, wherein after regularly scanning the tags of the products in the corresponding containing apparatus, the method further comprises labeling a scanning status as an "update" status when a recorded identifier is not found in a scan.

Clause 7: A method for monitoring a quality guarantee period of a product in a terminal, the method comprising: receiving an identifier, a quality guarantee period of a product, and an initial time sent from a scanning device, wherein the scanning device scans a tag of the product to obtain the identifier of the tag and the quality guarantee period of the product corresponding to the identifier, and records the initial time at which the tag is scanned in response to the identifier being a new identifier; and monitoring the quality guarantee period based on the quality guarantee period of the product and the initial time.

Clause 8: The method of claim 7, wherein monitoring the quality guarantee period comprises: performing a countdown calculation based on the initial time and the quality guarantee period of the product corresponding to the identifier; and reminding a user that the product to which the tag is attached has reached the quality guarantee period based on the identifier when a calculation result of the countdown calculation reaches a preset threshold.

Clause 9: The method of Clause 8, wherein the countdown calculation uses the following formula: $T_s = T_c + L - T_d$, wherein $T_s$ represents a remaining time, $T_c$ represents the initial time, L represents the quality guarantee period of the product, and $T_d$ represents a current time.

Clause 10: The method of any one of Clauses 7-9, wherein after monitoring the quality guarantee period based on the quality guarantee period of the product and the initial time, the method further comprises generating and displaying a statistical list of quality guarantee periods based on a result of monitoring quality guarantee periods.

Clause 11: The method of any one of Clauses 7-10, further comprising providing a prompt to a user in response to detecting that a time period of having no communications with the scanning device is greater than a preset time duration.

Clause 12: The method of any one of Clauses 7-11, wherein after receiving the identifier, the quality guarantee period of the product, and the initial time sent from the scanning device, the method further comprises sending a lightening instruction to the scanning device based on an operation of a user about selecting a product in a containing apparatus and an identifier thereof.

Clause 13: The method of any one of Clauses 7-12, further comprising sending an instruction of setting the quality guarantee period of the product to an encoder according to an operation of a user for setting the quality guarantee period of the product.

Clause 14: The method of Clause 13, wherein the instruction of setting the quality guarantee period of the product comprises a correspondence relationship between a color of the tag and the quality guarantee period of the product.

Clause 15: The method of any one of Clauses 8-14, wherein after monitoring the quality guarantee period based on the quality guarantee period of the product and the initial time, the method further comprises: receiving a current scanned list of identifiers sent by the scanning device; comparing a historically stored list of identifiers with the current scanned list of identifiers, and labeling an identifier that appears in the historically stored list of identifiers and not in the current scanned list of identifiers with a first status; and stopping a countdown calculation for a corresponding tag based on the identifier and the first status.

Clause 16: The method of Clause 15, wherein after stopping the countdown calculation for the corresponding tag based on the identifier and the first status, the method further comprises: comparing the historically stored list of identifiers with the current scanned list of identifiers, and labels the identifier, which reappears in the current scanned list of identifiers and is labeled with the first status, with a second status; and continuing the countdown calculation for the corresponding tag based on the identifier and the second status.

Clause 17: The method of any one of Clauses 8-14, wherein monitoring the quality guarantee period based on the quality guarantee period of the product and the initial time, the method further comprises: receiving identifier(s) that is/are recorded and a first status from the scanning device; labeling the recorded identifier(s) with the first status; and stopping countdown calculation(s) for corresponding tag(s) based on the recorded identifier(s) and the first status.

Clause 18: The method of Clause 17, wherein after stopping the countdown calculation(s) for the corresponding tag(s) based on the recorded identifier(s) and the first status, the method further comprises: receiving a recorded identifier and a second status from the scanning device; labeling the recorded identifier with the second status; and continuing a countdown calculation for a corresponding tag based on the recorded identifier and the second status.

Clause 19: The method of any one of Clauses 7-17, further comprising: obtaining a tag scanning status of the scanning device when communicating with the scanning device; and requesting the scanning device to send updated data when the tag scanning status is an "update" status.

Clause 20: A method for monitoring a quality guarantee period of a product in an encoder, the method comprising: assigning a new identifier to each tag to: allow a scanning device to scan a tag of a product to obtain an identifier of the tag and a product quality guarantee period corresponding to the identifier, enable the scanning device to record an initial time at which the tag is scanned when the identifier is a new identifier, enable the scanning device to send the identifier, the product quality guarantee period and the initial time to a terminal, and enable the terminal to perform monitoring of the quality guarantee period based on the product quality guarantee period and the initial time.

Clause 21: The method of claim 20, further comprising: receiving an instruction of setting the product quality guarantee period from the terminal; and setting the product quality guarantee period corresponding to the identifier for the tag based on the instruction of setting the product quality guarantee period.

Clause 22: The method of Clause 21, wherein: at least two tags have different colors, different product quality guarantee periods are set for tags of different colors, the instruction of setting the product quality guarantee period includes a correspondence relationship between a color and the product quality guarantee period, and setting the product quality guarantee period corresponding to the identifier for the tag based on the instruction of setting the product quality guarantee period includes setting the product quality guarantee period corresponding to the identifier and a color of the tag for the tag according to the instruction of setting the product quality guarantee period.

Clause 23: A scanning device for monitoring a quality guarantee period of a product, comprising: a first module configured to scan a tag of a product to obtain an identifier of the tag and a product quality guarantee period corresponding to the tag; a third module configured to record an initial time at which the tag is scanned when the identifier is a new identifier; and a fifth module configured to send the identifier, the product quality guarantee period and the initial time to a terminal, to enable the terminal to perform a quality guarantee period monitoring based on the product quality guarantee period and the initial time.

Clause 24: The scanning device of Clause 23, wherein the tag is an electronic tag, and the first module uses a RFID reading module.

Clause 25: The scanning device of Clause 23 or 24, further comprising: a seventh module configured to receive a lightening instruction from the terminal; and a ninth module configured to control an illumination unit to which the tag is attached to produce a light according to the lightening instruction.

Clause 26: The scanning device of any one of Clauses 23-25, wherein the first module is further configured to scan tags of products in a containing apparatus regularly, and wherein the scanning device further includes an eleventh module configured to send a current scanned list of identifiers to the terminal.

Clause 27: The scanning device of any one of Clauses 23-25, wherein the first module is further configured to scan tags of products in a containing apparatus regularly, and wherein the scanning device further includes a thirteenth module configured to send recorded identifier(s) and a first status to the terminal when the recorded identifier(s) is/are not found in a scan.

Clause 28: The scanning device of Clause 27, wherein the thirteenth module is further configured to send a recorded identifier and a second status in response to finding the recorded identifier again by scanning.

Clause 29. The scanning device of any one of Clauses 23-28, further comprising a fifteenth module to label a tag scanning status as an "update" status when no recorded identifier is found in a scan.

Clause 30: A terminal for monitoring a quality guarantee period of a product, comprising: a second module configured to receive an identifier, a quality guarantee period of a product, and an initial time sent from a scanning device, wherein the scanning device scans a tag of the product to obtain the identifier of the tag and the quality guarantee period of the product corresponding to the identifier, and records an initial time at which the tag is scanned in response to the identifier being a new identifier; and a fourth module configured to monitor the quality guarantee period based on the quality guarantee period of the product and the initial time.

Clause 31: The terminal of claim 30, wherein the fourth module is configured to perform a countdown calculation based on the initial time and the quality guarantee period of the product corresponding to the identifier, and remind a user that the product to which the tag is attached has reached the quality guarantee period based on the identifier in response to a calculation result of the countdown calculation reaching a preset threshold.

Clause 32: The terminal of Clause 31, wherein the following formula is used for the countdown calculation: $T_s=T_c+L-T_d$, wherein $T_s$ represents a remaining time, $T_c$ represents the initial time, L represents the quality guarantee period of the product, and $T_d$ represents a current time.

Clause 33: The terminal of any one of Clauses 30-32, further comprising a sixth module configured to generate and display a statistical list of quality guarantee periods based on a result of monitoring quality guarantee periods.

Clause 34: The terminal of any one of Clauses 30-33, further comprising an eighth module configured to provide a prompt to a user in response to detecting that a time period of having no communications with the scanning device is greater than a preset time duration.

Clause 35: The terminal of any one of Clauses 30-34, further comprising a tenth module configured to send a lightening instruction to the scanning device based on an operation of the user about selecting the product in a containing apparatus and the identifier.

Clause 36: The terminal of any one of Clauses 30-35, further comprising a twelfth module configured to send an instruction of setting the quality guarantee period of the product to an encoder according to an operation of the user for setting the quality guarantee period of the product.

Clause 37: The terminal of Clause 36, wherein the instruction of setting the quality guarantee period of the product includes a correspondence relationship between a color of the tag and the quality guarantee period of the product.

Clause 38: The terminal of any one of Clauses 30-37, further comprising: a fourteenth module configured to receive a current scanned list of identifiers sent by the scanning device; a sixteenth module configured to compare a historically stored list of identifiers with the current scanned list of identifiers, and label identifier(s) that appear(s) in the historically stored list of identifiers and not in the current scanned list of identifiers with a first status; and an eighteenth module configured to stop countdown calculation(s) for corresponding tag(s) based on the identifier(s) and the first status.

Clause 39: The terminal of Clause 38, wherein: the sixteenth module is further configured to compare the historically stored list of identifiers with the current scanned list of identifiers, and label an identifier, which reappears in the current scanned list of identifiers and is labeled with the first status, with a second status, and the eighteenth module is further configured to continue a countdown calculation for a corresponding tag based on the identifier and the second status.

Clause 40. The terminal of any one of Clauses 30-37, further comprising: a twentieth module configured to receive identifier(s) that is/are recorded and a first status from the scanning device; a twenty-second module configured to label the recorded identifier(s) with the first status; and a twenty-fourth module configured to stop countdown calculation(s) for corresponding tag(s) based on the recorded identifier(s) and the first status.

Clause 41: The terminal of Clause 40, wherein: the twentieth module is further configured to receive a recorded identifier and a second status from the scanning device, the twenty-second module is further configured to label the recorded identifier with the second status, and the twenty-fourth module is further configured to continue a countdown calculation for a corresponding tag based on the recorded identifier and the second status.

Clause 42: The terminal of any one of Clauses 30-41, further comprising: a twenty-sixth module configured to obtain a tag scanning status of the scanning device when conducting communications with the scanning device; and a twenty-eighth module configured to request the scanning device to send updated data when the tag scanning status is an "update" status.

Clause 43: An encoder for monitoring a quality guarantee period of a product, comprising: a thirty-first module configured to assign a new identifier to each tag to: allow a scanning device to scan a tag of a product to obtain an identifier of the tag and a product quality guarantee period corresponding to the identifier, enable the scanning device to record an initial time at which the tag is scanned when the identifier is a new identifier, enable the scanning device to send the identifier, the product quality guarantee period and the initial time to a terminal, and enable the terminal to perform monitoring of the quality guarantee period based on the product quality guarantee period and the initial time.

Clause 43: The encoder of Clause 43, further comprising: a thirty-second module configured to receive an instruction of setting the product quality guarantee period from the terminal; and a thirty-third module configured to set the product quality guarantee period corresponding to the identifier for the tag based on the instruction of setting the product quality guarantee period.

Clause 45: The encoder of Clause 44, further comprising at least two tags have different colors, different product quality guarantee periods are set for tags of different colors, and the instruction of setting the product quality guarantee period includes a correspondence relationship between a color and the product quality guarantee period, and wherein the thirty-third module is configured to set the product quality guarantee period corresponding to the identifier and a color of the tag for the tag according to the instruction of setting the product quality guarantee period.

Clause 46: The encoder of any one of Clauses 43-45, wherein the encoder comprises a plurality of containing cavities, each containing cavity is used for placing tags of a same color, and a respective color of each containing cavity corresponds to a color of a tag, and wherein the thirty-third module is configured to individually set tags in each containing cavity with respective product quality guarantee periods corresponding to individually identifiers and colors of the tags according to an instruction of setting a product quality guarantee period.

Clause 47: A system for monitoring a quality guarantee period of a product, comprising: the scanning device of any one of Clauses 23-29, and the terminal of any one of Clauses 30-42.

Clause 48: The system of Clause 47, further comprising the encoder of any one of Clauses 43-46.

Clause 49: The system of Clause 47 or 48, wherein: the scanning device is deployed inside a containing apparatus, the scanning device communicates with the terminal through a communication unit; the communication unit is deployed outside the containing apparatus, and the scanning device is coupled to the communication unit via a data line.

What is claimed is:

1. A method implemented by a scanning device, the method comprising:
   scanning a tag of a product and obtaining an identifier of the tag and a product quality guarantee period corresponding to the identifier;

recording an initial time at which the tag is scanned in response to the identifier being a new identifier;

sending the identifier, the product quality guarantee period and the initial time to a terminal to enable the terminal to monitor the product quality guarantee period based on the product quality guarantee period and the initial time;

regularly scanning tags of products in a corresponding containing apparatus; and sending a current scanned list of identifiers to the terminal.

2. The method of claim 1, further comprising:

receiving a lightening instruction from the terminal; and controlling an illumination unit that attaches to the tag to produce a light according to the lightening instruction.

3. The method of claim 1, further comprising:

regularly scanning tags of products in a corresponding containing apparatus; and sending one or more recorded identifiers and a first status to the terminal if the one or more recorded identifiers are not found in a scan.

4. The method of claim 3, further comprising sending a recorded identifier of the one or more recorded identifiers and a second status to the terminal if the recorded identifier is found in a new scan after the one or more recorded identifiers and the first status are sent to the terminal.

5. The method of claim 1, further comprising labeling a scanning status as an "update" status when a recorded identifier is not found in a scan.

6. One or more processor-readable media storing executable instructions that, when executed by a terminal, cause the terminal to perform acts comprising:

receiving an identifier, a quality guarantee period of a product, and an initial time sent from a scanning device;

monitoring the quality guarantee period based on the quality guarantee period of the product and the initial time;

performing a countdown calculation based on the initial time and the quality guarantee period of the product corresponding to the identifier; and reminding a user that the product to which the tag is attached has reached the quality guarantee period based on the identifier when a calculation result of the countdown calculation reaches a preset threshold.

7. The one or more processor-readable media of claim 6, the acts further comprising generating and displaying a statistical list of quality guarantee periods based on a result of monitoring quality guarantee periods.

8. The one or more processor-readable media of claim 6, the acts further comprising providing a prompt to a user in response to detecting that a time period of having no communications with the scanning device is greater than a preset time duration.

9. The one or more processor-readable media of claim 6, the acts further comprising sending a lightening instruction to the scanning device based on an operation of a user about selecting the product in a containing apparatus and the identifier.

10. The one or more processor-readable media of claim 6, the acts further comprising sending an instruction of setting the quality guarantee period of the product to an encoder according to an operation of a user for setting the quality guarantee period of the product.

11. The one or more processor-readable media of claim 10, wherein the instruction of setting the quality guarantee period of the product comprises a correspondence relationship between a color of the tag and the quality guarantee period of the product.

12. The one or more processor-readable media of claim 6, the acts further comprising:

receiving a current scanned list of identifiers sent by the scanning device;

comparing a historically stored list of identifiers with the current scanned list of identifiers, and labeling one or more identifiers that appear in the historically stored list of identifiers and not in the current scanned list of identifiers with a first status; and stopping countdown calculations for corresponding tags based on the one or more identifiers and the first status.

13. The one or more processor-readable media of claim 6, the acts further comprising:

receiving a current scanned list of identifiers sent by the scanning device;

comparing a historically stored list of identifiers with the current scanned list of identifiers, and labels one or more identifiers that reappear in the current scanned list of identifiers and are labeled with a first status with a second status; and continuing countdown calculations for corresponding tags based on the one or more identifiers and the second status, wherein the first status indicates that the one or more identifiers are not previously in a containing apparatus.

14. The one or more processor-readable media of claim 6, further comprising:

receiving one or more recorded identifiers and a first status from the scanning device;

labeling the one or more recorded identifiers with the first status; and stopping countdown calculations for corresponding tags based on the one or more recorded identifiers and the first status.

15. The one or more processor-readable media of claim 14, wherein after stopping the countdown calculations for the corresponding tags based on the one or more processor-executable media and the first status, the acts further comprise:

receiving a recorded identifier of the one or more recorded identifier and a second status from the scanning device;

labeling the recorded identifier with the second status; and continuing a countdown calculation for a corresponding tag based on the recorded identifier and the second status.

16. An apparatus, comprising:

one or more processors, memory, coupled to the one or more processors, the memory storing thereon computer-executable modules, executable by the one or more processors the executable modules including a first module for scanning a tag of a product and obtaining an identifier of the tag and a product quality guarantee period corresponding to the identifier;

a second module for receiving a lightening instruction from the terminal; and a third module for recording an initial time at which the tag is scanned in response to the identifier being a new identifier;

a fifth module for sending the identifier, the product quality guarantee period and the initial time to a terminal to enable the terminal to monitor the product quality guarantee period based on the product quality guarantee period and the initial time; and a fourth module for controlling an illumination unit that attaches to the tag to produce a light according to the lightening instruction.

17. The apparatus of claim 16, wherein the first module is further configured to scan tags of products in a containing apparatus regularly, and wherein the scanning device further includes an eleventh module configured to send a current scanned list of identifiers to the terminal.

18. The apparatus of claim 16, wherein the first module is further configured to scan tags of products in a containing apparatus regularly, and wherein the scanning device further includes a thirteenth module configured to send recorded identifier(s) and a first status to the terminal when the recorded identifier(s) is/are not found in a scan.

19. The apparatus of claim 18, wherein the thirteenth module is further configured to send a recorded identifier and a second status in response to finding the recorded identifier again by scanning.

20. The apparatus of claim 16, further comprising a fifteenth module to label a tag scanning status as an "update" status when no recorded identifier is found in a scan.

\* \* \* \* \*